US011304168B2

(12) United States Patent
Jeon et al.

(10) Patent No.: US 11,304,168 B2
(45) Date of Patent: *Apr. 12, 2022

(54) RANDOM ACCESS PREAMBLES USING TRANSMIT BEAMS OF A BASE STATION

(71) Applicant: Ofinno, LLC, Reston, VA (US)

(72) Inventors: Hyoungsuk Jeon, Centreville, VA (US); Esmael Dinan, McLean, VA (US); Kyungmin Park, Vienna, VA (US); Alireza Babaei, Fairfax, VA (US); Hua Zhou, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/020,139

(22) Filed: Sep. 14, 2020

(65) Prior Publication Data

US 2020/0413364 A1 Dec. 31, 2020

Related U.S. Application Data

(63) Continuation of application No. 16/101,126, filed on Aug. 10, 2018, now Pat. No. 10,785,739.

(Continued)

(51) Int. Cl.
*H04W 56/00* (2009.01)
*H04W 76/40* (2018.01)
(Continued)

(52) U.S. Cl.
CPC ...... *H04W 56/0045* (2013.01); *H04B 7/0695* (2013.01); *H04W 16/28* (2013.01);
(Continued)

(58) Field of Classification Search
CPC ........... H04W 56/0045; H04W 74/006; H04W 76/40; H04W 16/28; H04W 48/20;
(Continued)

(56) References Cited

U.S. PATENT DOCUMENTS 9,258,750 B2 2/2016 Li et al.
9,661,663 B1 5/2017 Lin et al.
(Continued)

FOREIGN PATENT DOCUMENTS

WO 2016086144 6/2016

OTHER PUBLICATIONS

Xia, Tingting, et al. "Maritime internet of things: challenges and solutions." IEEE Wireless Communications 27.2 (2020): 188-196. (Year: 2020).*

(Continued)

*Primary Examiner* — Sharad Rampuria
(74) *Attorney, Agent, or Firm* — Brett Gardner; Kavon Nasabzadeh; Jacob L. Mangan

(57) ABSTRACT

A wireless device receives, from a first base station, configuration parameters indicating: a cell radio identifier of the wireless device; and random access preambles of a cell of a second base station. One or more random access preambles of the random access preambles using transmit beams is transmitted to the second base station via the cell. At least one random access response identified by the cell radio identifier of the wireless device is received. The at least one random access response comprises a first preamble identifier corresponding to a first random access preamble of the one or more random access preambles. The first random access preamble is transmitted by a first transmit beam of the transmit beams. Data using the first transmit beam is transmitted to the second base station.

20 Claims, 37 Drawing Sheets

Related U.S. Application Data

(60) Provisional application No. 62/543,830, filed on Aug. 10, 2017, provisional application No. 62/543,833, filed on Aug. 10, 2017.

(51) Int. Cl.
  *H04W 16/28* (2009.01)
  *H04W 48/20* (2009.01)
  *H04B 7/06* (2006.01)
  *H04W 74/00* (2009.01)

(52) U.S. Cl.
  CPC ......... *H04W 48/20* (2013.01); *H04W 74/006* (2013.01); *H04W 76/40* (2018.02)

(58) Field of Classification Search
  CPC .. H04B 7/0695; H04B 1/7073; H04B 1/7087; H04B 1/7156; H04B 1/7183; H04B 7/18589; H04B 7/19; H04B 7/2125; H04B 2201/7073; H04H 60/50; H04J 3/06; H04J 3/0602; H04J 3/0605; H04J 3/0614; H04J 3/0617
  See application file for complete search history.

(56) References Cited

U.S. PATENT DOCUMENTS

| | | | |
|---|---|---|---|
| 10,009,800 | B2 | 6/2018 | Hahn et al. |
| 10,785,739 | B2* | 9/2020 | Jeon ................. H04B 7/0695 |
| 2017/0251460 | A1 | 8/2017 | Agiwal et al. |
| 2018/0070380 | A1 | 3/2018 | Nagaraja et al. |
| 2018/0077732 | A1 | 3/2018 | Yi et al. |
| 2018/0213493 | A1 | 7/2018 | Chakraborty et al. |
| 2018/0324853 | A1 | 11/2018 | Jeon et al. |

OTHER PUBLICATIONS

Liu, Jin, et al. "Initial access, mobility, and user-centric multi-beam operation in 5G new radio." IEEE Communications Magazine 56.3 (2018): 35-41. (Year: 2018).*
R1-1709897; 3GPP TSG RAN WG1 NR Ad-hoc#2; Qingdao, P.R. China, Jun. 27-30, 2017; Source: ZTE; Title: 4-step random access procedure; Agenda Item: 5.1.1.4.4; Document for: Discussion and Decision.
R1-1710035; 3GPP TSG RAN WG1 NR Ad-Hoc#2; Qingdao, P.R. China Jun. 27-30, 2017; Source: CATT; Title: Further details on NR 4-step RA Procedure; Agenda Item: 5.1.1.4.4; Document for: Discussion and Decision.
R1-1710138; 3GPP TSG RAN WG1 NR Ad-Hoc#2; Qingdao, P.R. China Jun. 27-30, 2017; Source: Guangdong OPPO Mobile Telecom; Title: NR 4-Step Random Access Procedure; Agenda Item: 5.1.1. 4.4; Document for: Discussion and Decision.
R1-1710234; 3GPP TSG RAN WG1 NR Ad-hoc#2; Qingdao, P.R. China Jun. 27-30, 2017; Agenda item: 5.1.1.4.4; Source: Fujitsu; Title: Discussion on 4-step RA procedure; Document for: Discussion and Decision.
R1-1710271; 3GPP TSG RAN WG1 Meeting NR#2; Qingdao, P.R. China Jun. 27-30, 2017; Agenda Item: 5.1.1.4.4; Source: LG Electronics; Title: RACH procedure; Document for: Discussion and Decision.
R1-1710478; 3GPP TSG RAN WG1 NR Ad-Hoc Meeting; Qingdao, China Jun. 27-30, 2017; Agenda Item: 5.1.1.4.4; Source: Huawei, HiSilicon; Title: RACH procedures and resource configuration; Document for: Discussion and decision.
R1-1710513; 3GPP TSG RAN WG1 NR Adhoc #2; Qingdao, P.R. China, Jun. 27-30, 2017; Source: Intel Corporation; Title: 4-step PRACH procedures; Agenda item: 5.1.1.4.4; Document for: Discussion and Decision.
R1-1710636; 3GPP TSG RAN WG1 Meeting NR AH #2; Qingdao, China, Jun. 27-30, 2017; Agenda Item: 5.1.1.4.4; Source: Samsung; Title: 4-step RACH procedure discussion; Document for: Discussion and Decision.
R1-1710824; 3GPP TSG RAN WG1 NR Ad-Hoc#2; Qingdao, P.R. China Jun. 27-30, 2017; Agenda item: 5.1.1.4.4; Source: MediaTek Inc.; Title: On 4-step RACH procedure; Document for: Discussion and decision.
R1-1710860; 3GPP TSG RAN WG1 NR Ad-Hoc#2; Qingdao, P.R. China Jun. 27-30, 2017; Agenda Item: 5.1.1.4.4; Source: SONY; Title: Considerations on 4-step RA Procedure; Document for: Discussion / Decision.
R1-1710871; 3GPP TSG-RAN WG1 NR Ad-Hoc#2; Qingdao, P.R. China, Jun. 27-20, 2017; Agenda Item: 5.1.1.4.4; Source: InterDigital Inc.; Title: Multiple Msg1 transmissions for one monitored RAR window; Document for: Discussion, Decision.
R1-1710892; 3GPP TSG RAN WG1 NR Ad-Hoc#2; Qingdao, China, Jun. 27-30, 2017; Agenda item: 5.1.1.4.4; Source: Nokia, Alcatel-Lucent Shanghai Bell; Title: NR 4-step RACH procedure; Document for: Discussion and Decision.
R1-1711068; 3GPP TSG RAN WG1 NR Ad-Hoc#2; Qingdao, P.R. China Jun. 27-30, 2017; Source: NTT Docomo, Inc.; Title: Discussion on 4-step RA procedure for NR; Agenda Item: 5.1.1.4.4; Document for: Discussion and Decision.
R1-1711148; 3GPP TSG-RAN WG1 Meeting #89; Hangzhou, China, May 15-19, 2017; Agenda item: 5.1.1.4.4; Source: Qualcomm Incorporated; Title: 4-step RACH procedure consideration; Document for: Discussion/Decision.
R1-1711279; 3GPP TSG RAN WG1 NR Ad-Hoc#2; Qingdao, P. R. China, Jun. 27-30, 2017; Agenda item: 5.1.1.4.4; Source: Motorola Mobility, Lenovo; Title: RACH configuration and procedure; Document for: Discussion and decision.
R1-1711383; 3GPP TSG-RAN WG1 NR Ad-Hoc#2; Qingdao, China, Jun. 27-30, 2017; Agenda Item: 5.1.1.4.4; Source: Ericsson; Title: 4-step random access procedure; Document for: Discussion, Decision.
R2-1706461; 3GPP TSG-RAN WG2 NR Ad Hoc; Qingdao, China, Jun. 27-29, 2017; Agenda item: 10.3.1.4.2; Source: Huawei, HiSilicon; Title: Impact of beamforming to RACH Procedures; Document for: Discussion and decision.
R2-1706535, (Revision of R2-1704158); 3GPP TSG-RAN WG2 NR#2; Qingdao, China, Jun. 27-29, 2017; Agenda item: 10.3.1.4.1; Source: Samsung; Title: Random Access Procedure—Access Delay Minimisation; Document for: Discussion & Decision.
R2-1706987; 3GPP TSG-RAN WG2 NR Ad Hoc #2; Qingdao, China, Jun. 27-29, 2017; Agenda Item : 10.3.1.4.2 (NR_newRAT-Core); Source : LG Electronics Inc.; Title : Potential impact of multiple/repeated preambles on RA; Document for : Discussion and Decision.
R2-1707028; (Revision of R2-1701744); 3GPP TSG RAN WG2#NR_AdHoc#2; Qingdao, China, Jun. 27-29, 2017; Agenda item: 10.3.1.4.2; Source: Intel Corporation; Title: Random Access Multi-Beam Aspects; Document for: Discussion and Decision.
R2-1707078; 3GPP TSG-RAN WG2 NR Ad Hoc; Qingdao, China, Jun. 27-29, 2017; Source: vivo; Title: RACH procedure of multiple preambles transmission; Agenda Item: 10.3.1.4.2; Document for: Discussion and Decision.
Tdoc R2-1707129; 3GPP TSG-RAN WG2 #98-AdHoc; Qingdao, China, Jun. 27-29, 2017; Agenda Item: 10.3.1.4.2; Source: Ericsson; Title: On Multiple PRACH Resource Type in NR; Document for: Discussion, Decision.
Tdoc R2-1707131; 3GPP TSG-RAN WG2 #98-AH; Qingdao, P.R. of China, Jun. 27-29, 2017; Agenda Item: 10.3.1.4.2; Source: Ericsson; Title: Multiple Preamble Transmissions in NR Random Access; Document for: Discussion, Decision.
R2-1707265; 3GPP TSG-RAN WG2 NR Ad Hoc #2; Qingdao, China, Jun. 27-29, 2017; Agenda Item: 10.3.1.4.2 Souce: MediaTek Inc.; Title: MAC design for beamformed RACH; Document for: Discussion and decision.
Tdoc R2-1707279; 3GPP TSG-RAN WG2 Ad Hoc on NR; Qingdao, P.R. of China, Jun. 27-29, 2017; Agenda Item: 10.3.1.4.2; Source: Ericsson; Title: Higher layer implications of beamforming during random access Document for: Discussion.

(56) References Cited

OTHER PUBLICATIONS

R2-1707500; 3GPP TSG-RAN WG2 NR Ad Hoc; Quingdao, China, Jun. 27-29, 2017; Agenda Item: 11.1.1; Source: Vice-Chairwoman (InterDigital); Title: Report from NR User Plane Break-Out Session; Document for: Approval.

3GPP TSG RAN WG1 NR Ad-Hoc#; Qingdao, P.R. China, Jun. 27-30, 2017; Title: RAN1 Chairman's Notes.

3GPP TR 38.802 V14.1.0 (Jun. 2017); Technical Report; 3rd Generation Partnership Project; Technical Specification Group Radio Access Network; Study on New Radio Access Technology; Physical Layer Aspects (Release 14).

3GPP TR 38.804 V14.0.0 (Mar. 2017); Technical Report; 3rd Generation Partnership Project; Technical Specification Group Radio Access Network; Study on New Radio Access Technology; Radio Interface Protocol Aspects (Release 14).

\* cited by examiner

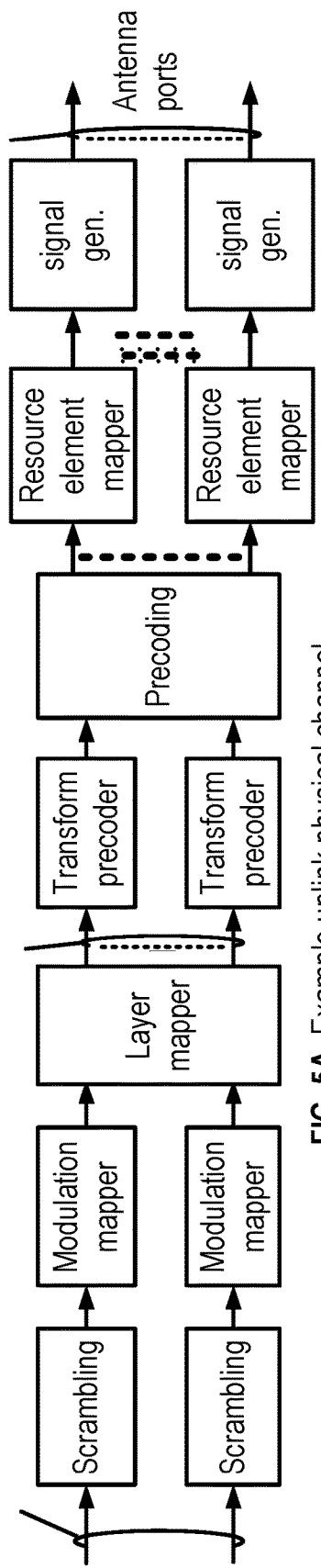
FIG. 5A Example uplink physical channel
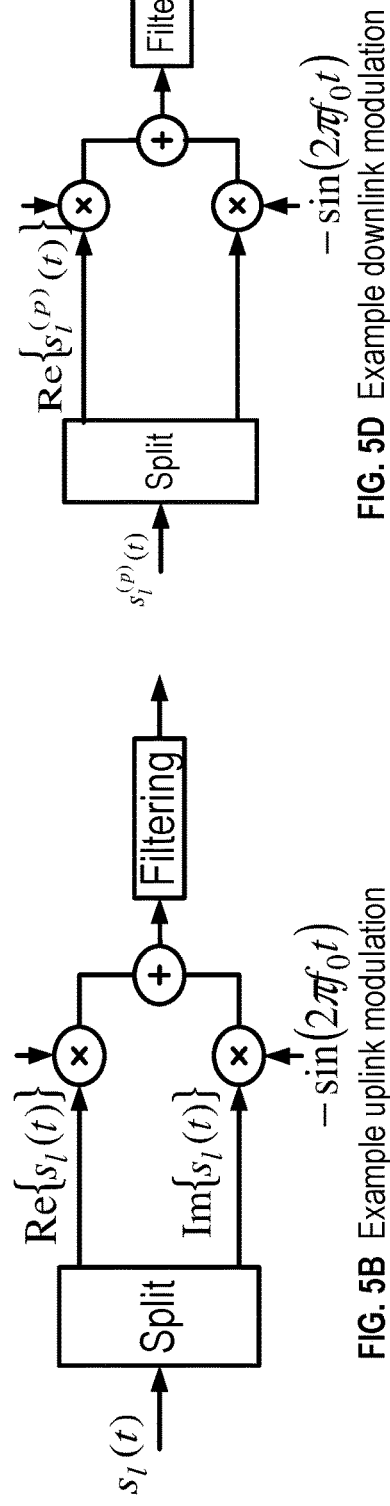
FIG. 5B Example uplink modulation
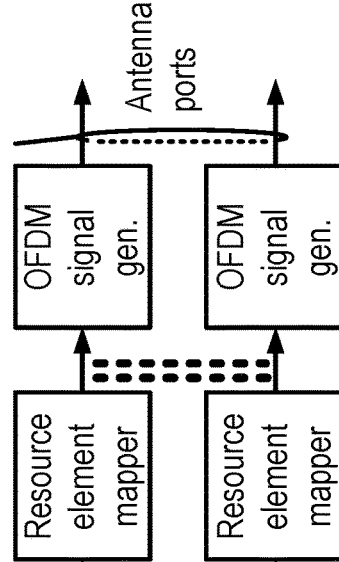
FIG. 5D Example downlink modulation
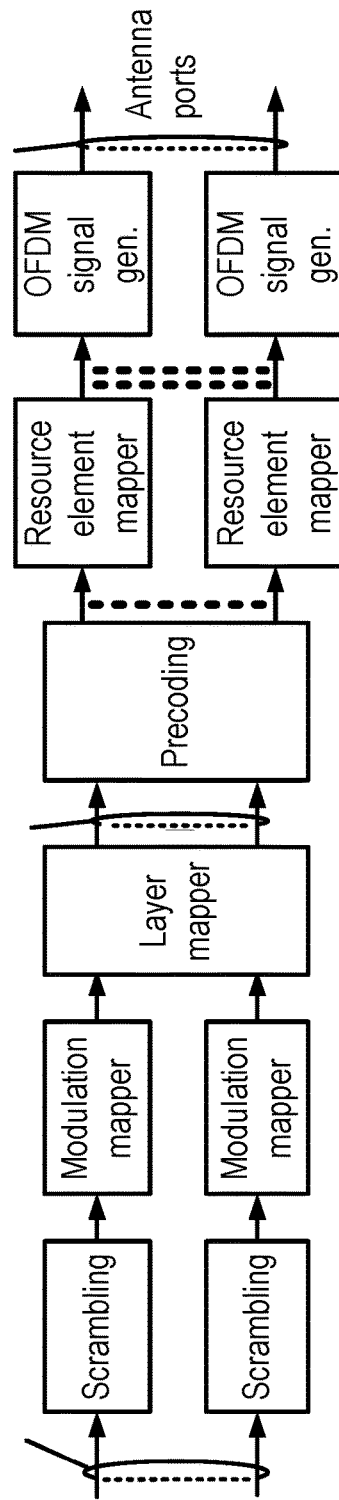
FIG. 5C Example downlink physical channel FIG. 7 Dual-Connectivity- two MAC entities at UE side Example 1: 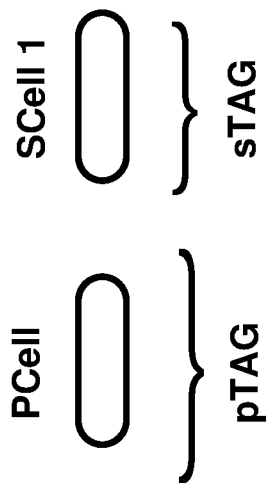
Example 2: 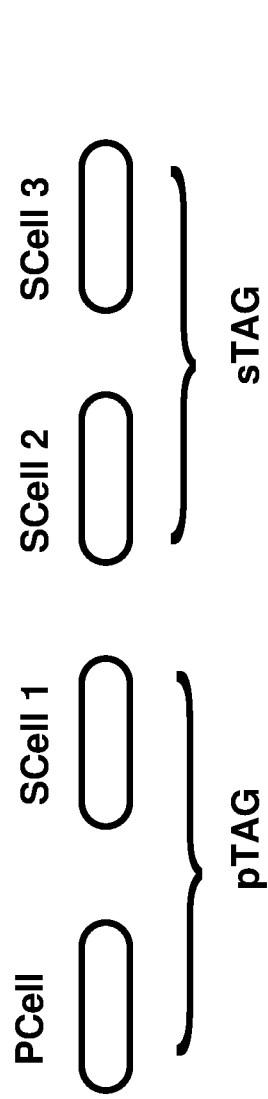
Example 3: 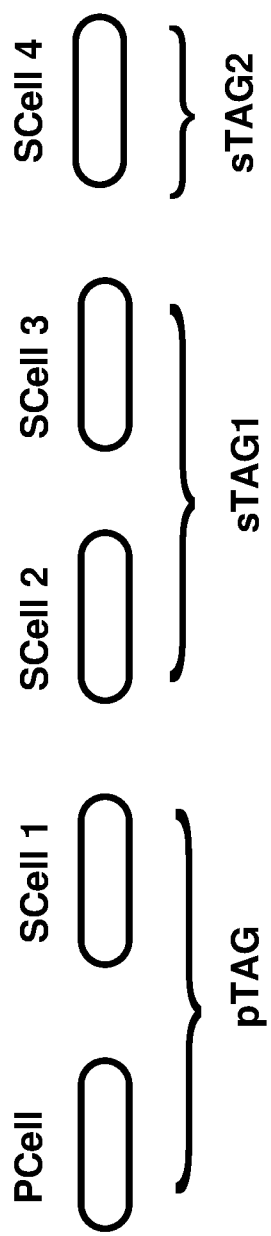
FIG. 8 gNB connected to NGC eLTE eNB connected to NGC

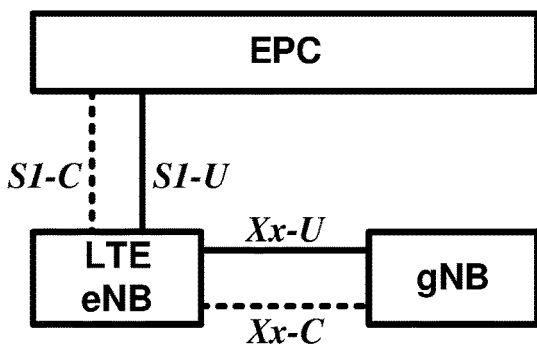

LTE eNB connected to EPC with non-standalone gNB.
gNB user plane connected to EPC via LTE eNB.

FIG. 11A

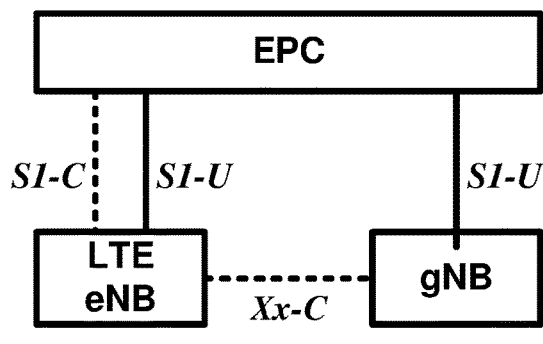

LTE eNB connected to EPC with non-standalone gNB.
gNB user plane connected to EPC directly.

FIG. 11B

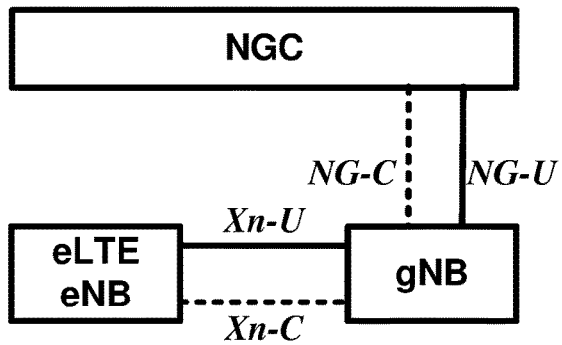

gNB connected to NGC with non-standalone eLTE eNB.
eLTE eNB user plane connected to NGC via gNB.

FIG. 11C

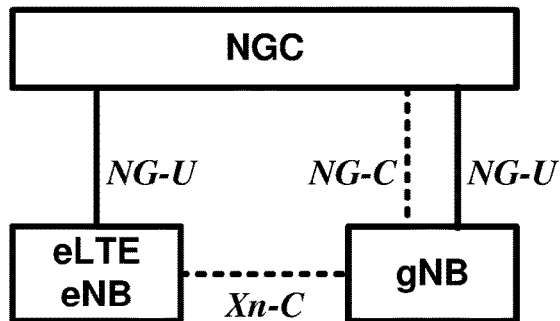

gNB connected to NGC with non-standalone eLTE eNB.
eLTE eNB user plane connected to NGC directly.

FIG. 11D

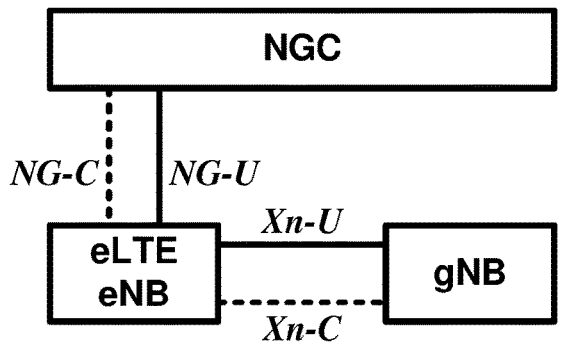

eLTE eNB connected to NGC with non-standalone gNB.
gNB user plane connected to NGC via eLTE eNB.

FIG. 11E

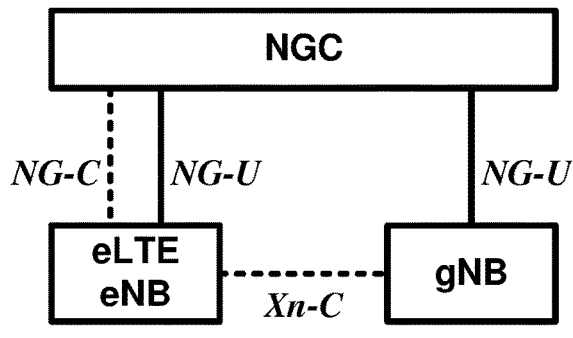

eLTE eNB connected to NGC with non-standalone gNB.
gNB user plane connected to NGC directly.

FIG. 11F

Radio protocol architecture for split bearer and SCG bearer. LTE eNB connected to EPC with non-standalone gNB.

Radio protocol architecture for split bearer and SCG bearer. gNB connected to NGC with non-standalone eLTE eNB.

Radio protocol architecture for split bearer and SCG bearer. eLTE eNB connected to NGC with non-standalone gNB.

Non-centralized deployment

Centralized deployment

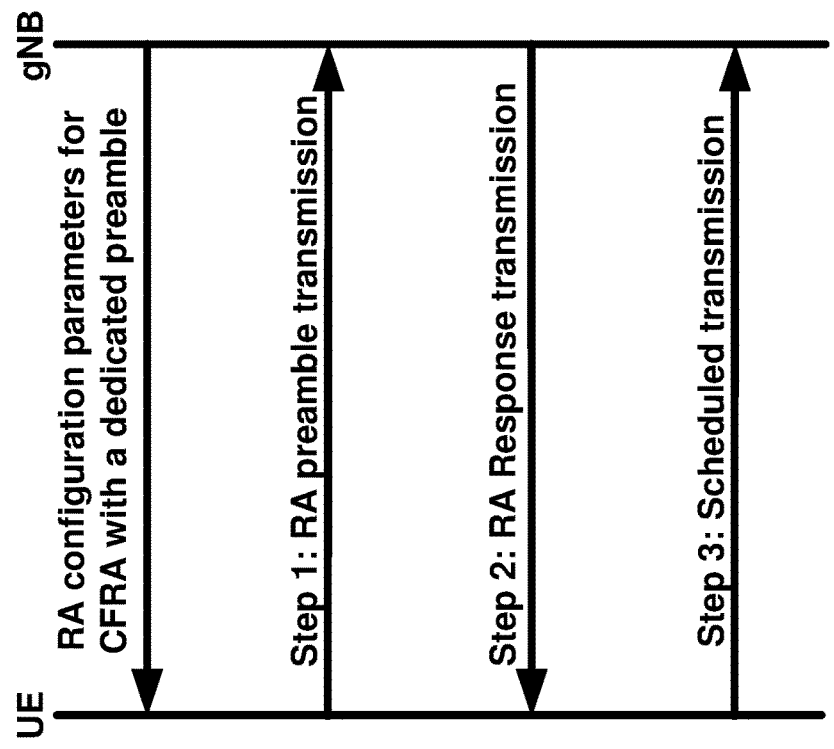
FIG. 15B Contention free RA procedure
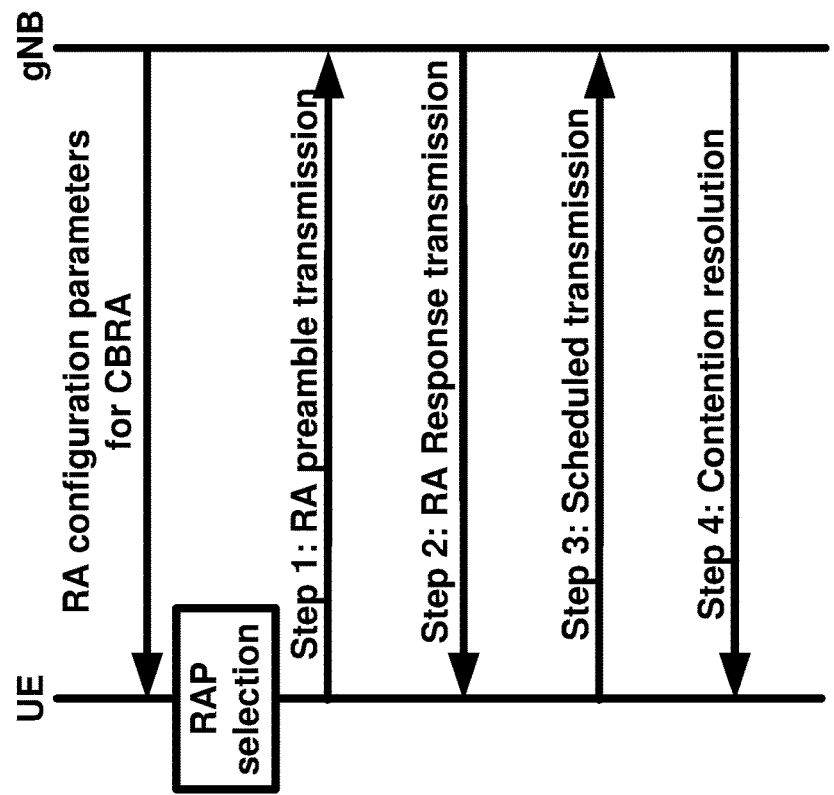
FIG. 15A Contention-based RA procedure

FIG. 17A MAC RAR

FIG. 17B MAC RAR for PRACH enhanced coverage level 2 or 3

FIG. 17C MAC RAR for NB-IoT UEs

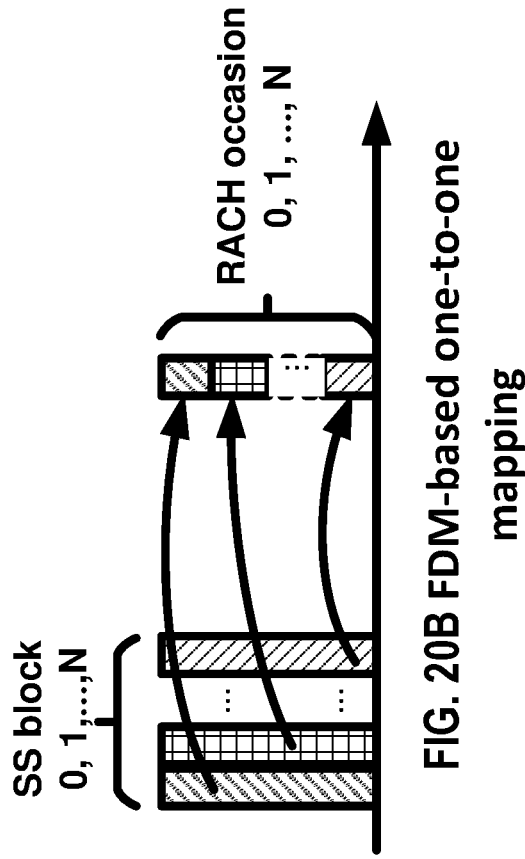
FIG. 20A TDM-based one-to-one mapping
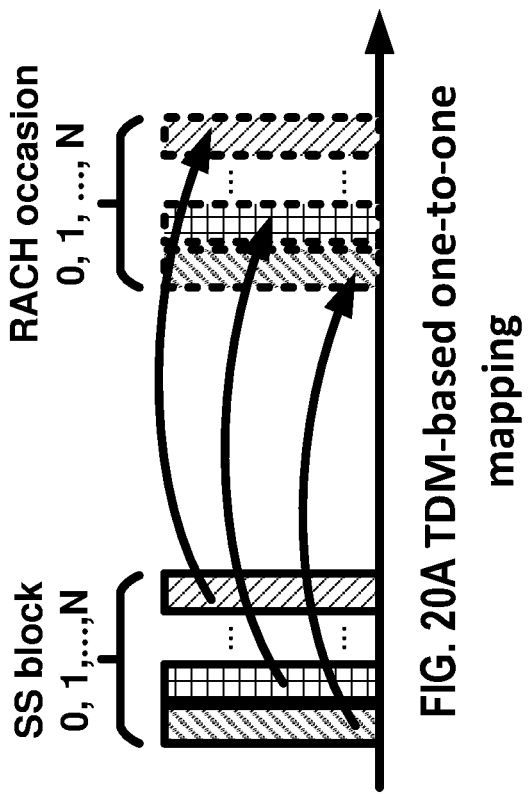
FIG. 20B FDM-based one-to-one mapping
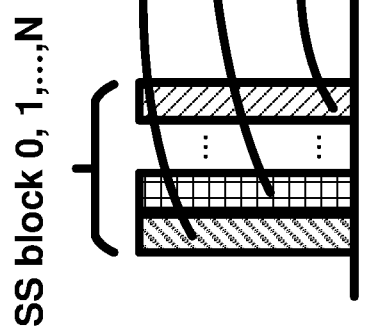
FIG. 20C multi-to-one mapping

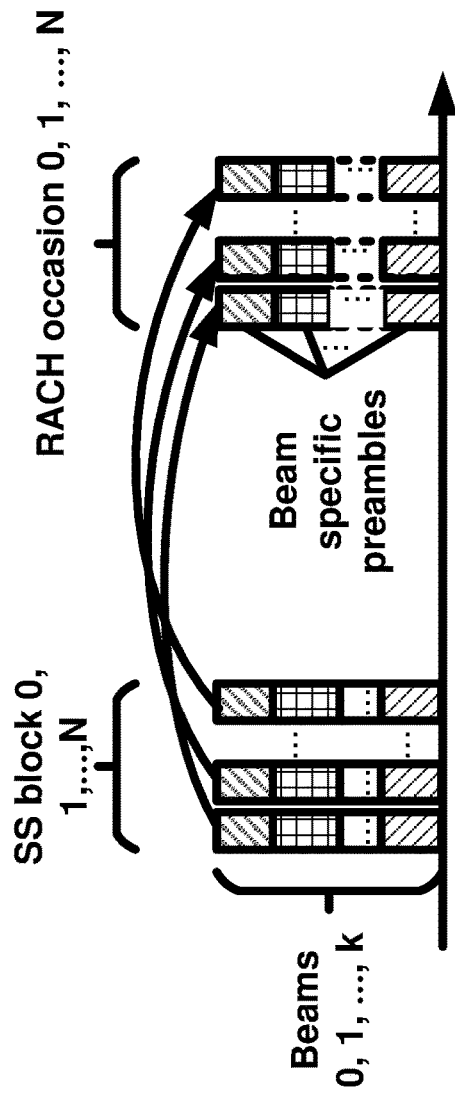 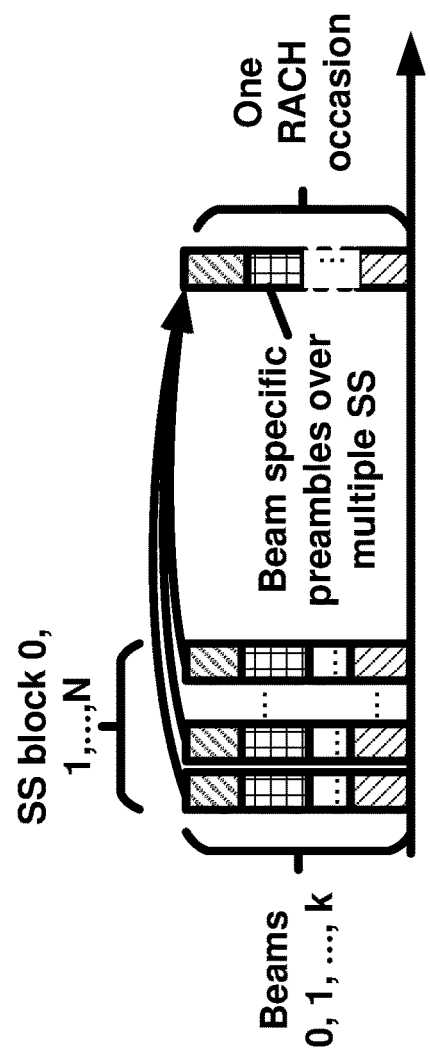
FIG. 23A one-to-one mapping
FIG. 23B multi-to-one mapping

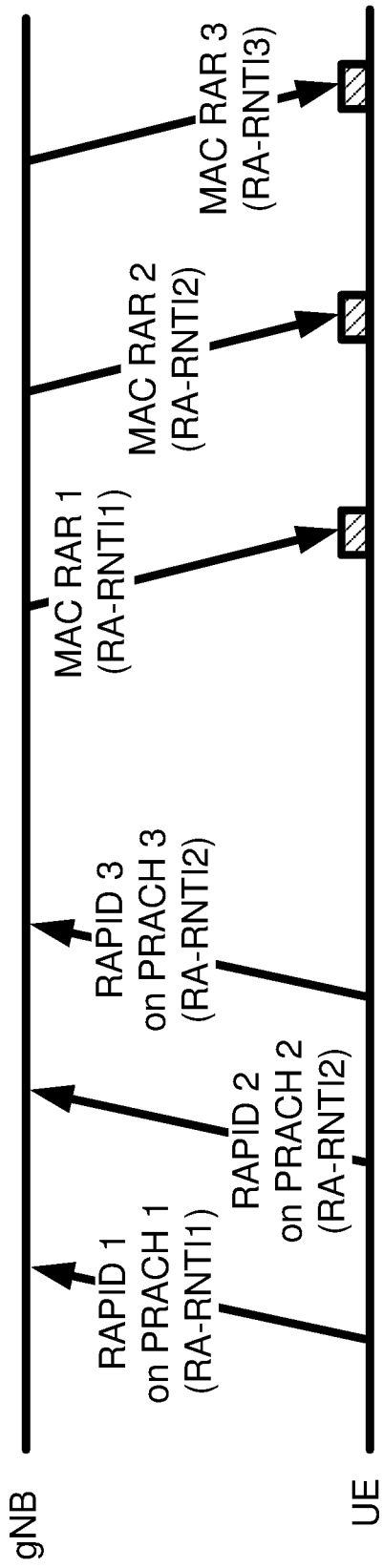
FIG. 25A Example of multiple RARs corresponding to multiple RAP transmissions
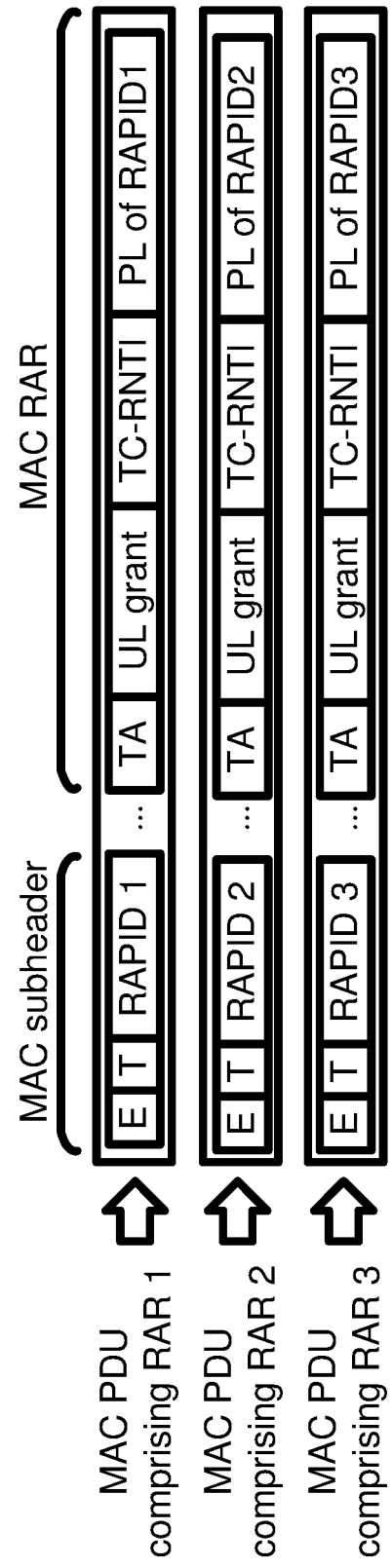
FIG. 25B Example of a RAR comprising an indicator indicating a UL pathloss (PL) measurements

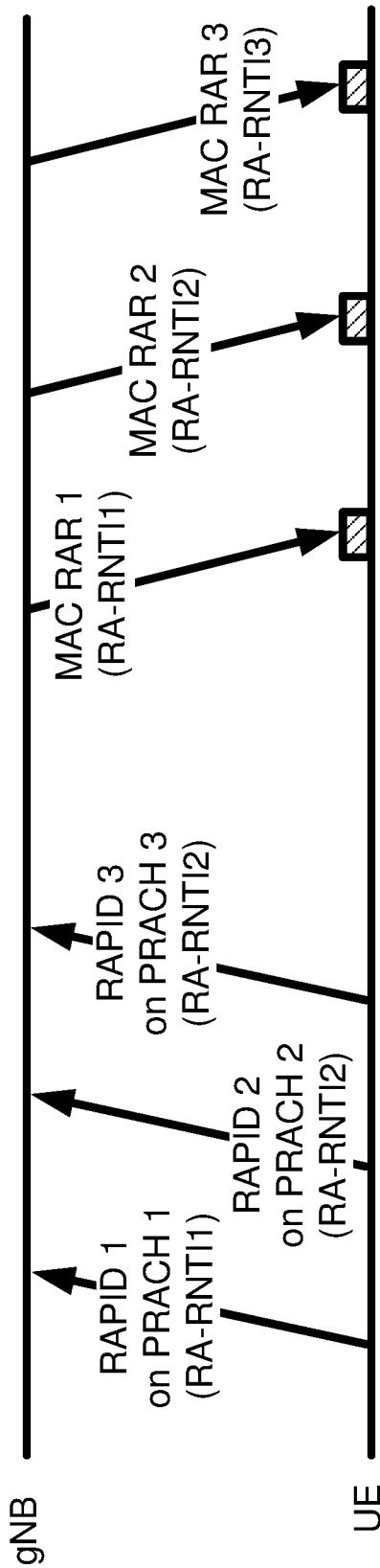
FIG. 26A Example of multiple RARs corresponding to multiple RAP transmissions;
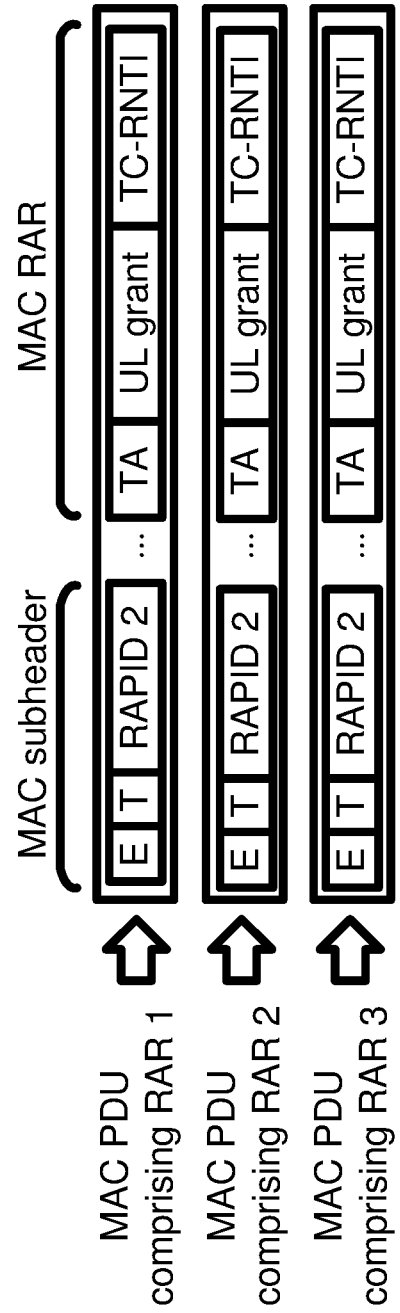
FIG. 26B Example of a MAC subheader comprising an indicator (RAPID 2) for indicating a preferred RAP transmission Receive, by a wireless device from a 1st base station, message(s) comprising one or more configuration parameters indicating: a cell radio identifier; a plurality of random access preambles of the cell; and random access channel occasion(s) of the cell
3010

Transmit, to the 2nd base station via the random access channel occasion(s) of the cell, one or more random access preambles of the plurality of random access preambles using a plurality of transmit beams
3020

Receive, at least one random access response identified by the cell radio identifier, where the at least one random access response comprises a first preamble identifier corresponding to a first random access preamble of the one or more random access preambles
3030

Determine a first transmit beam of the plurality of transmit beams used to transmit the first random access preamble
3040

Transmit, by the wireless device to the second base station, data using the first transmit beam
3050

FIG. 30

Transmit, by a 2nd base station via a 1st base station to a wireless device, message(s) comprising one or more configuration parameters of the 2nd base station comprising a cell, where the one or more configuration parameters indicate: a cell radio identifier; a plurality of random access preambles of the cell; and random access channel occasion(s) of the cell
3110

Receive, by the 2nd base station via the random access channel occasion(s) of the cell, one or more random access preambles of the plurality of random access preambles
3120

Determine a 1st random access preamble of the one or more random access preambles, where a pathloss measurement value of the first random access preamble is equal to or larger than pathloss measurement values of the one or more random access preambles
3130

Transmit, by the 2nd base station, at least one random access response identified by the cell radio identifier, where the at least one random access response comprises the first preamble identifier corresponding to a 1st random access preamble
3140

FIG. 31

Transmit, by a base station to a wireless device, via a downlink control channel of a 1st cell, at least one downlink control information indicating: a plurality of random access channels of a 2nd cell; and one or more random access preambles, each of the one or more random access preambles being associated with at least one of the plurality of random access channels
3310

Receive, by the base station from the wireless device, at least one of the one or more random access preambles via two or more random access channels of the 2nd cell
3320

Determine a 1st random access identifier corresponding to a 1st random access channel of the two or more random access channels, where the 1st random access identifier is selected based on pathloss measurements measured via the two or more random access channels
3330

Transmit, by the base station to the wireless device, at least one random access response scrambled by the 1st random access identifier of the 1st random access channel, where the at least one random access response comprises a preamble identifier corresponding to one of the at least one of the one or more random access preambles
3340

FIG. 33

Receive, by a wireless device from a base station, message(s) comprising one or more parameters indicating: one or more random access preambles; a plurality of transmission occasions; and a first number of allowed preamble transmissions
3410

Transmit, at least one of the one or more random access preambles via one or more transmission occasions of the plurality of transmission occasions, wherein the one or more transmission occasions comprise a 1st transmission occasion
3420

Determine a starting time of a random access response window based on: a time associated with the 1st transmission occasion; a 1st offset depending on the 1st number; and a 2nd offset
3430

Start to monitor a control channel for at least one random access response from the starting time
3440

FIG. 34

Transmit, by a 2nd base station via a 1st base station to a wireless device, message(s) comprising one or more parameters indicating: one or more random access preambles; a plurality of transmission occasions; and a 1st number of allowed preamble transmissions
3510

Receive, by the second base station, at least one of the one or more random access preambles via one or more transmission occasions of the plurality of transmission occasions, where the one or more transmission occasions comprise a 1st transmission occasion
3520

Determine, by the second base station, a starting time of a random access response window based on: a time associated with the 1st transmission occasion; a 1st offset depending on the 1st number; and a 2nd offset
3530 transmitting, by the 2nd base station via a control channel, at least one random access response during the random access response window
3540

FIG. 35

Receive, by a wireless device from a base station, message(s) comprising one or more configuration parameters of a 2nd cell indicating: a 1st number of preamble transmission occasions; and a plurality of transmission occasions
3610

Receive, via one or more downlink control channels of a 1st cell, at least one downlink control information comprising one or more random access configuration parameters of the 2nd cell, the one or more random access configuration parameters indicate one or more random access preambles
3620

Transmit at least one of the one or more random access preambles via one or more transmission occasions of the plurality of transmission occasions, where the one or more transmission occasions comprise a 1st transmission occasion
3630

Determine a starting time of a RAR window based on: a time associated with the 1st transmission occasion; a 1st offset depending on the 1st number; and a 2nd offset
*3640* start to monitor a control channel for an RAR from the starting time
3650

FIG. 36

Transmit, by a base station comprising a 1st cell and a 2nd cell to a wireless device, message(s) comprising one or more configuration parameters of a 2nd cell indicating: a 1st number of preamble transmission occasions; and a plurality of transmission occasions
3710

Transmit, via one or more downlink control channels of a 1st cell, at least one downlink control information comprising one or more random access configuration parameters of the 2nd cell, the one or more random access configuration parameters indicate one or more random access preambles
3720

Receive at least one of the one or more random access preambles via one or more transmission occasions of the plurality of transmission occasions, where the one or more transmission occasions comprise a 1st transmission occasion
3730

Determine a starting time of a RAR window based on: a time associated with the 1st transmission occasion; a 1st offset depending on the 1st number; and a 2nd offset
3740

Transmit, by the base station via a control channel, at least one radon access response during the random access response window
3750

FIG. 37

RANDOM ACCESS PREAMBLES USING TRANSMIT BEAMS OF A BASE STATION

CROSS-REFERENCE TO RELATED APPLICATIONS

This application is a continuation of U.S. patent application Ser. No. 16/101,126, filed Aug. 10, 2018, which claims the benefit of U.S. Provisional Application No. 62/543,830, filed Aug. 10, 2017, and U.S. Provisional Application No. 62/543,833, filed Aug. 10, 2017, which are hereby incorporated by reference in its entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present disclosure.

FIG. 8 shows example TAG configurations as per an aspect of an embodiment of the present disclosure.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e) LTE eNB) as per an aspect of an embodiment of the present disclosure.

FIG. 15A and FIG. 15B are examples of a contention-based four-step RA procedure and contention free RA procedure as per an aspect of an embodiment of the present disclosure.

FIG. 17A, FIG. 17B, and FIG. 17C are example MAC RAR formats as per an aspect of an embodiment of the present disclosure.

FIG. 20A, FIG. 20B, and FIG. 20C are examples of TDM and FDM mapping of PRACH resources as per an aspect of an embodiment of the present disclosure.

FIG. 23A and FIG. 23B are examples of mapping beam specific preambles to PRACH occasion: FIG. 23A is an example of one-to-one mapping and FIG. 23B is an example of k-to-one mapping as per an aspect of an embodiment of the present disclosure.

FIG. 25A and FIG. 25B are examples of a MAC RAR format comprising an indicator indicating a received signal strength as per an aspect of an embodiment of the present disclosure.

FIG. 26A and FIG. 26B are examples of a MAC RAR format comprising a RAPID in a MAC subheader that indicates a preferred RAP transmission of multiple RAP transmissions as per an aspect of an embodiment of the present disclosure.

FIG. 30 is an example flow diagram as per an aspect of an embodiment of the present disclosure.

FIG. 31 is an example flow diagram as per an aspect of an embodiment of the present disclosure.

FIG. 33 is an example flow diagram as per an aspect of an embodiment of the present disclosure.

FIG. 34 is an example flow diagram as per an aspect of an embodiment of the present disclosure.

FIG. 35 is an example flow diagram as per an aspect of an embodiment of the present disclosure.

FIG. 36 is an example flow diagram as per an aspect of an embodiment of the present disclosure.

FIG. 37 is an example flow diagram as per an aspect of an embodiment of the present disclosure.

DETAILED DESCRIPTION OF EMBODIMENTS

Figure 1:
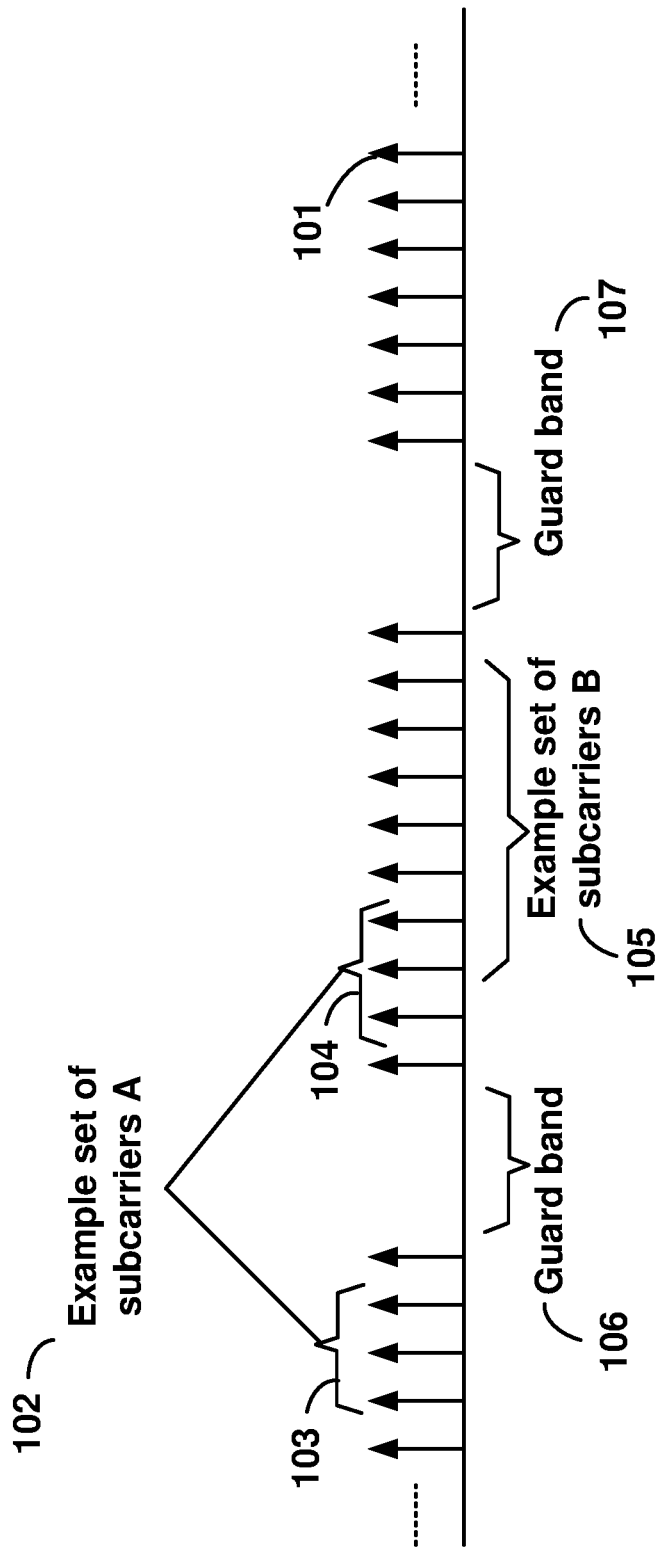
FIG. 1 is a diagram depicting example sets of OFDM subcarriers as per an aspect of an embodiment of the present disclosure.

Example embodiments of the present invention enable operation of carrier aggregation. Embodiments of the technology disclosed herein may be employed in the technical field of multicarrier communication systems. More particularly, the embodiments of the technology disclosed herein may relate to signal timing in a multicarrier communication systems.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control
RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time interval
TB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present disclosure. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
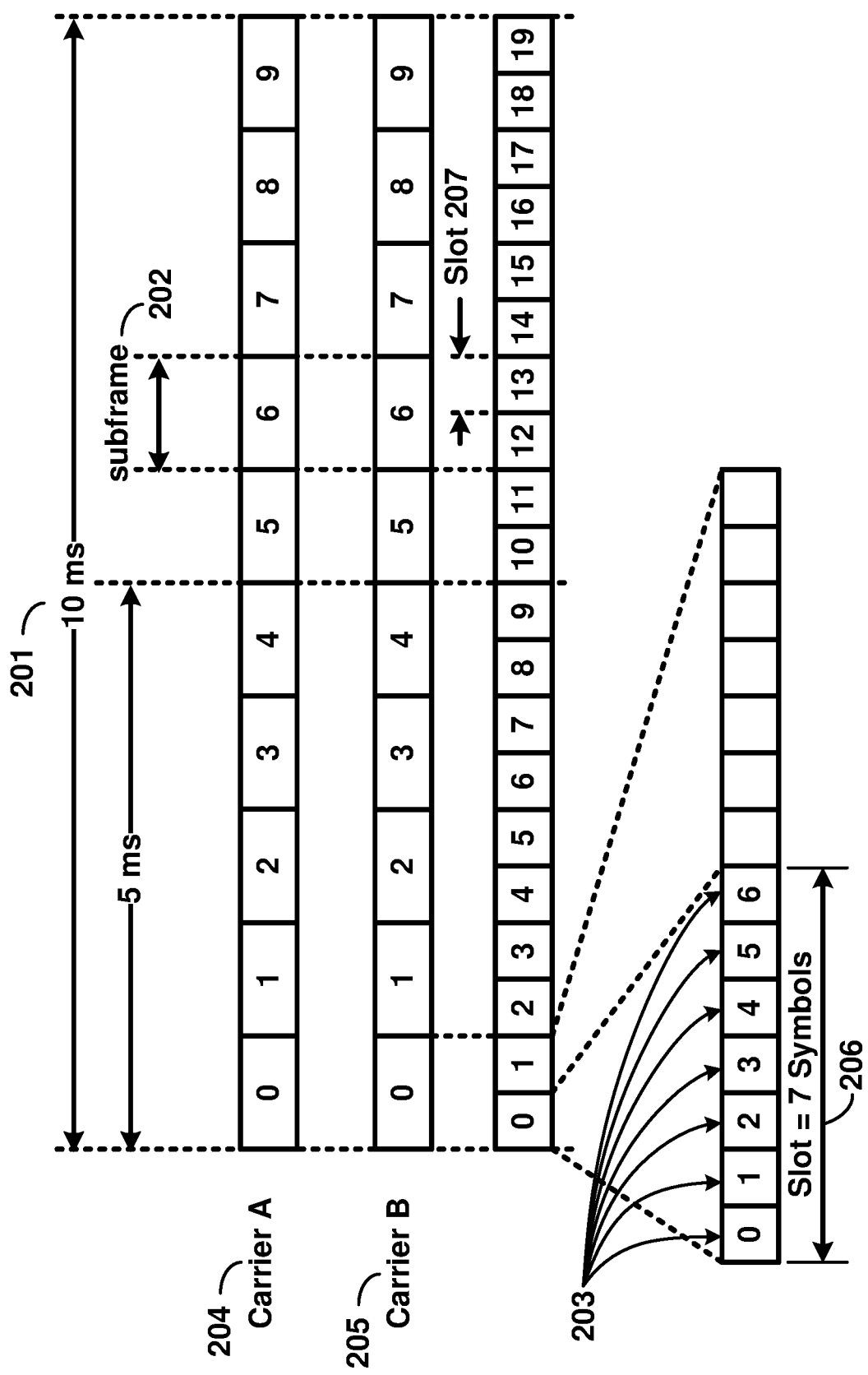
FIG. 2 is a diagram depicting an example transmission time and reception time for two carriers in a carrier group as per an aspect of an embodiment of the present disclosure.

FIG. 2 is a diagram depicting an example transmission time and reception time for two carriers as per an aspect of an embodiment of the present disclosure. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may comprise of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
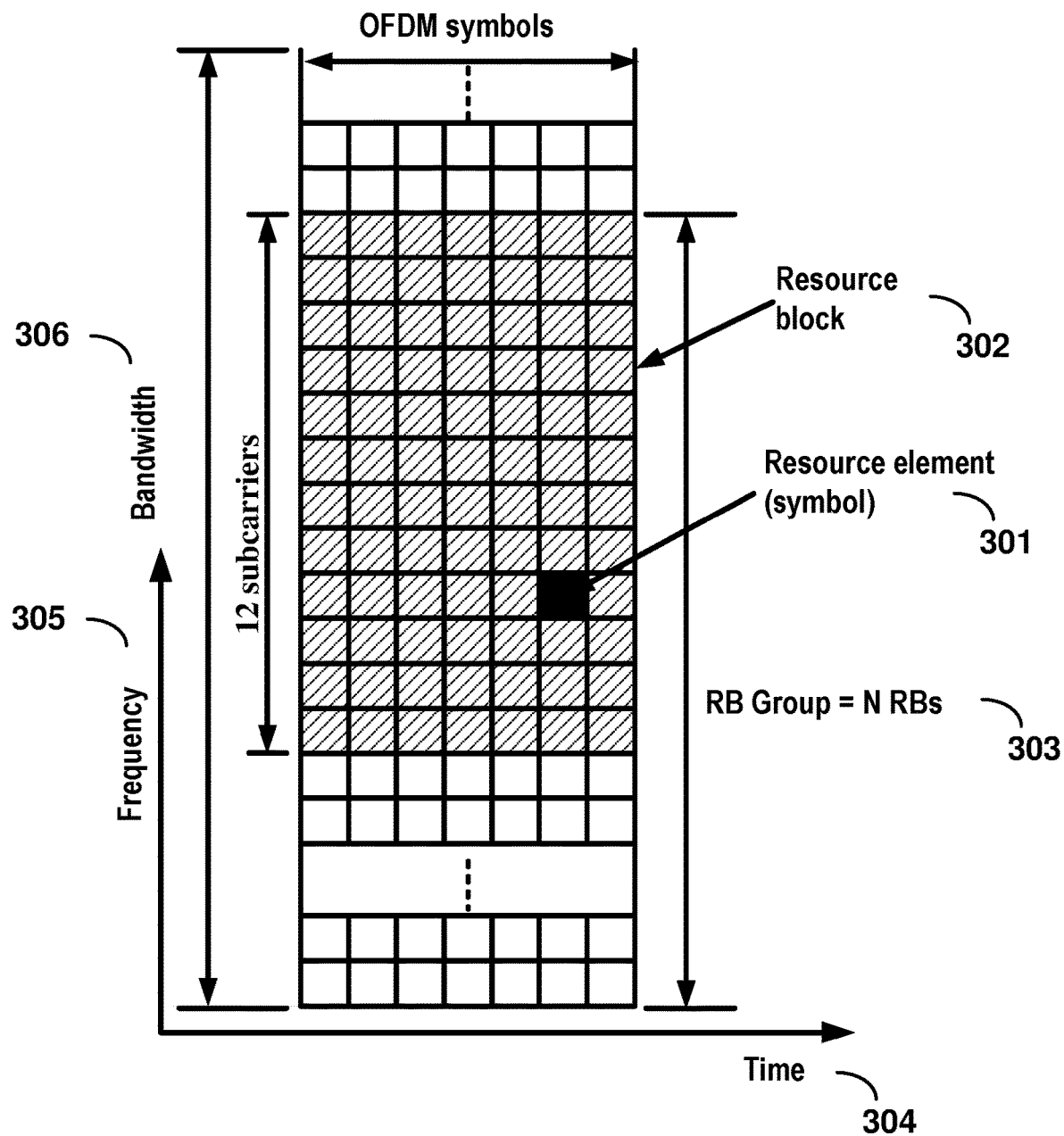
FIG. 3 is a diagram depicting OFDM radio resources as per an aspect of an embodiment of the present disclosure.

FIG. 3 is a diagram depicting OFDM radio resources as per an aspect of an embodiment of the present disclosure. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present disclosure. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for an antenna port, and/or the like.

Example modulation and up-conversion to the carrier frequency of the complex-valued DFTS-OFDM/SC-FDMA baseband signal for an antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in codewords to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port, and/or the like.

Example modulation and up-conversion to the carrier frequency of the complex-valued OFDM baseband signal for an antenna port is shown in FIG. 5D. Filtering may be employed prior to transmission.

Figure 4:
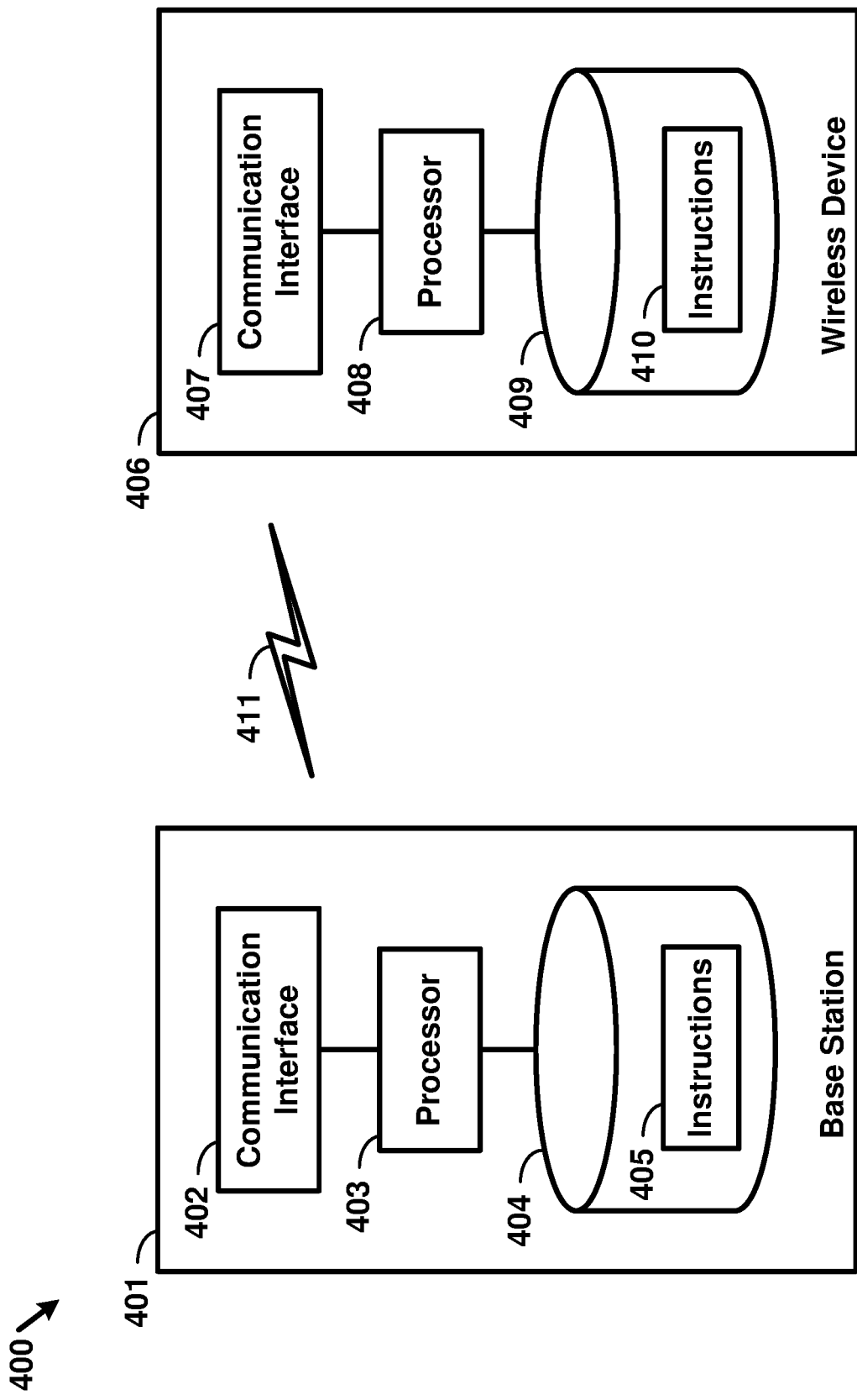
FIG. 4 is a block diagram of a base station and a wireless device as per an aspect of an embodiment of the present disclosure.

FIG. 4 is an example block diagram of a base station 401 and a wireless device 406, as per an aspect of an embodiment of the present disclosure. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

Figure 10A:
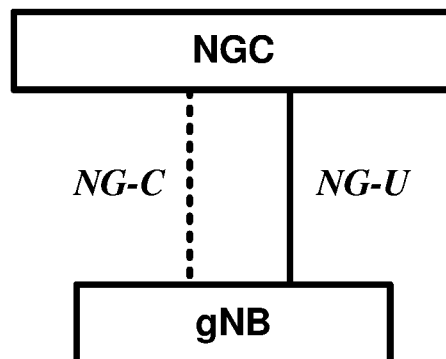
FIG. 10A and FIG. 10B are example diagrams for interfaces between a 5G core network (e.g. NGC) and base stations (e.g. gNB and eLTE eNB) as per an aspect of an embodiment of the present disclosure.
Figure 10B:
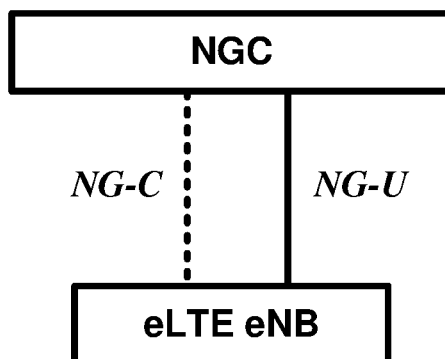

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present disclosure. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
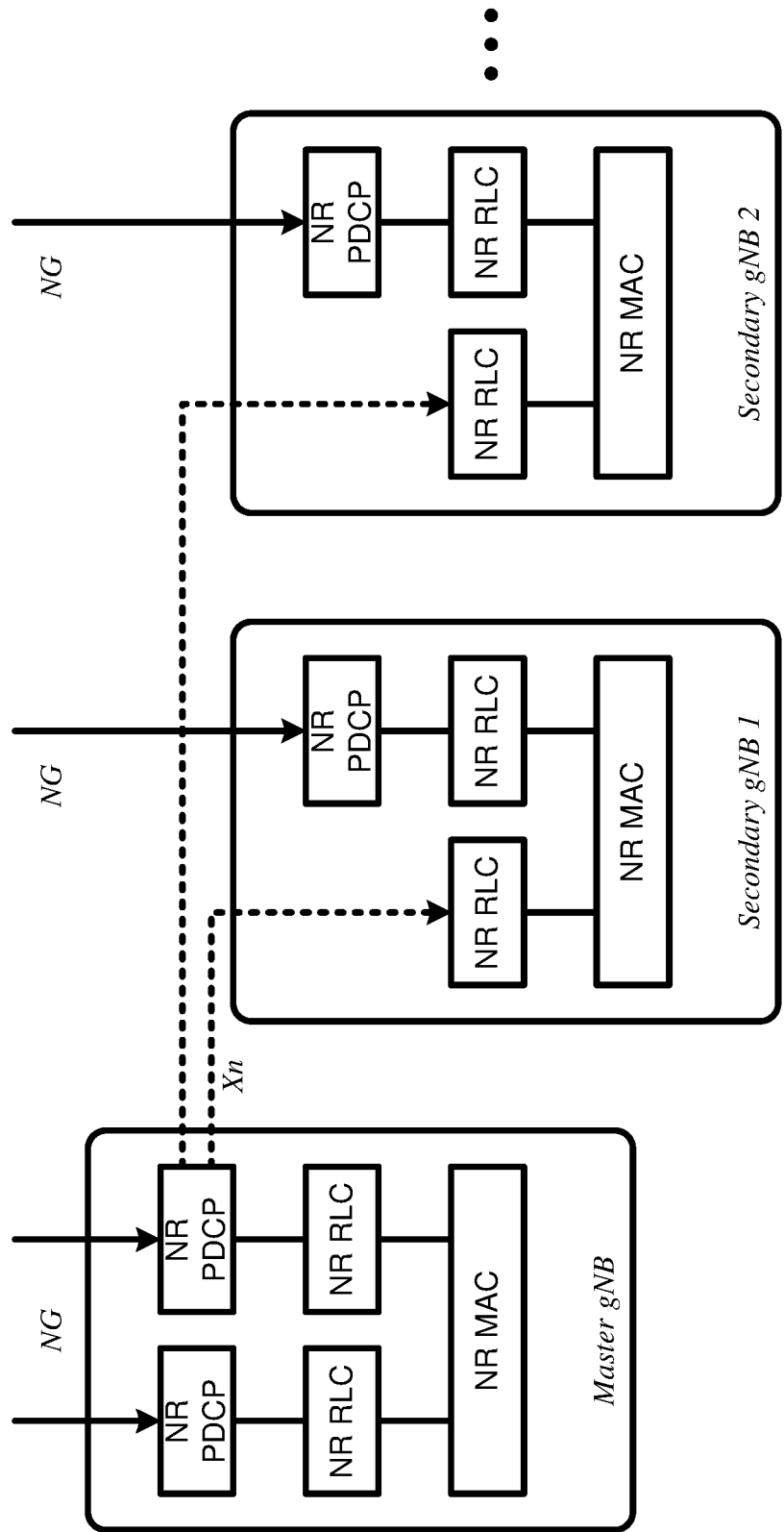
FIG. 6 is an example diagram for a protocol structure with multi-connectivity as per an aspect of an embodiment of the present disclosure.
Figure 7:
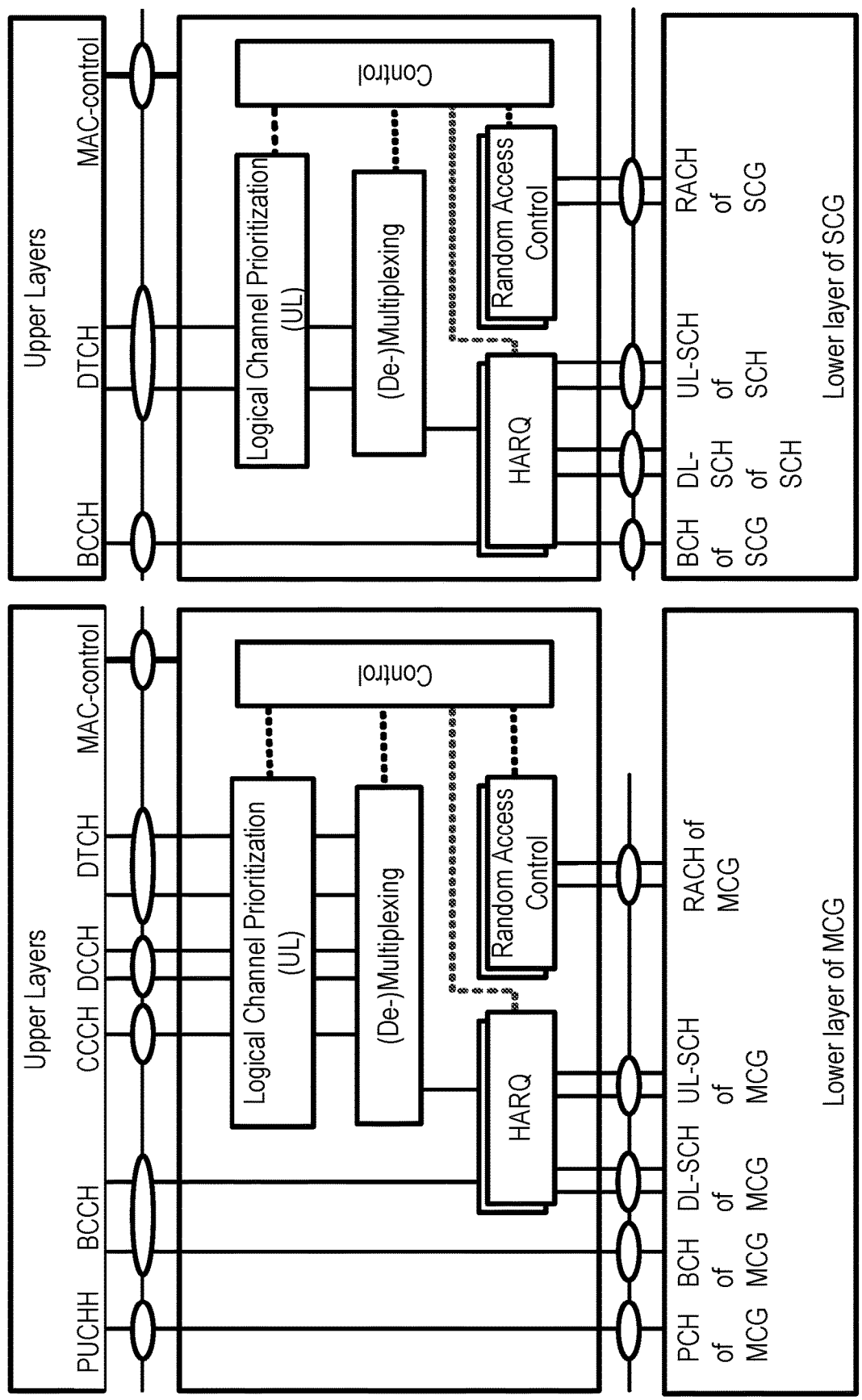
FIG. 7 is an example diagram for a protocol structure with CA and DC as per an aspect of an embodiment of the present disclosure.

FIG. 6 and FIG. 7 are example diagrams for protocol structure with CA and multi-connectivity as per an aspect of an embodiment of the present disclosure. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three examples of bearers, including, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the disclosure.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE; upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present disclosure. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
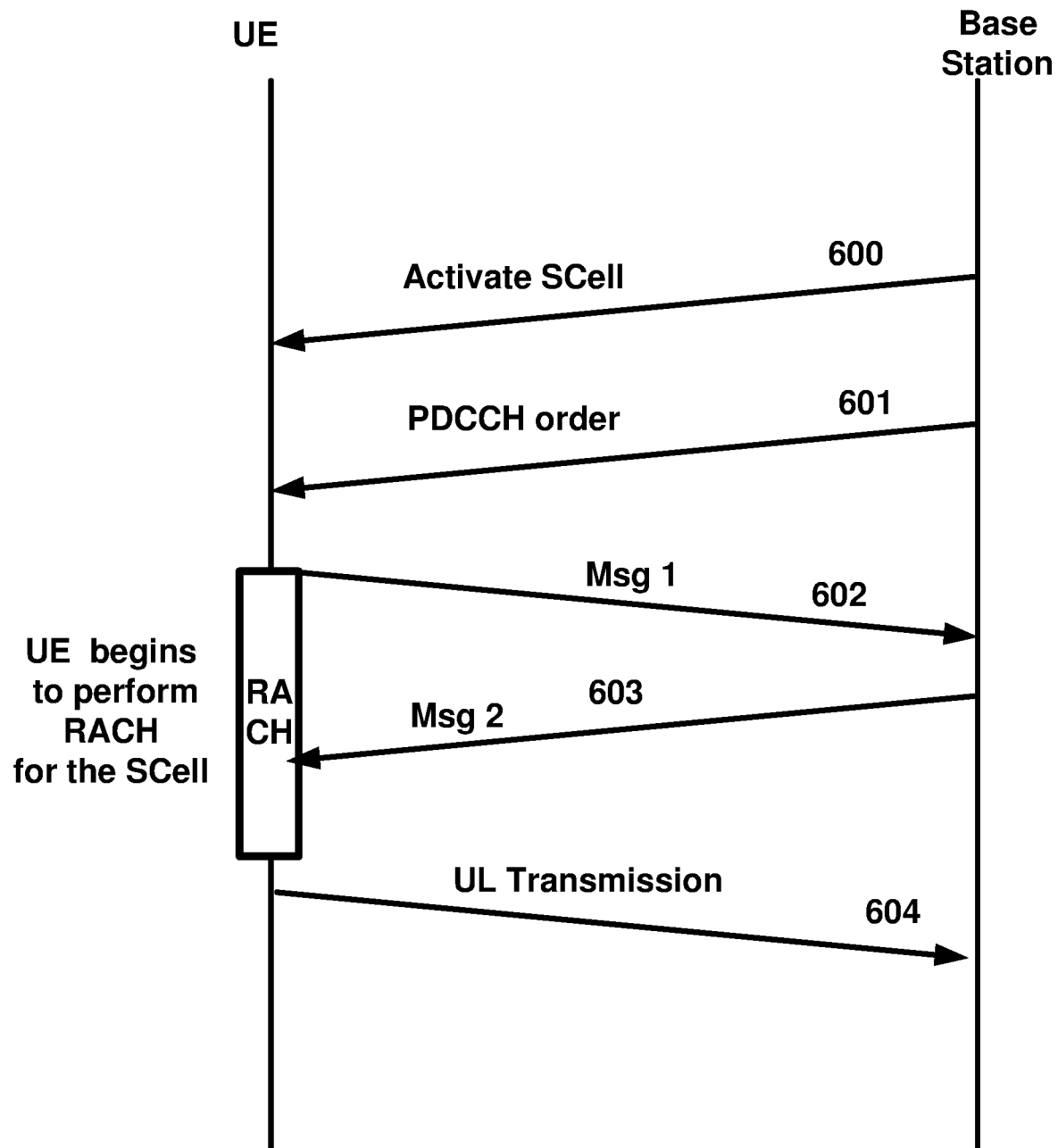
FIG. 9 is an example message flow in a random access process in a secondary TAG as per an aspect of an embodiment of the present disclosure.

FIG. 9 is an example message flow in a random access process in a secondary TAG as per an aspect of an embodiment of the present disclosure. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The timeAlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the disclosure may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present disclosure. The tight interworking may enable a multiple RX/TX UE in RRC_CONNECTED to be configured to utilize radio resources provided by two schedulers located in two base stations (e.g. (e) LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

Figure 12A:
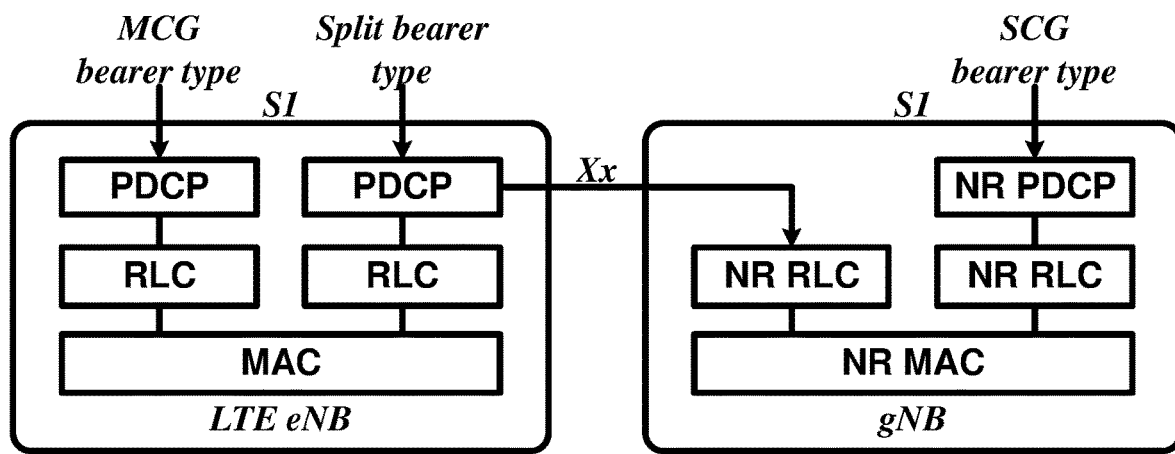
FIG. 12A, FIG. 12B, and FIG. 12C are example diagrams for radio protocol structures of tight interworking bearers as per an aspect of an embodiment of the present disclosure.
Figure 12B:
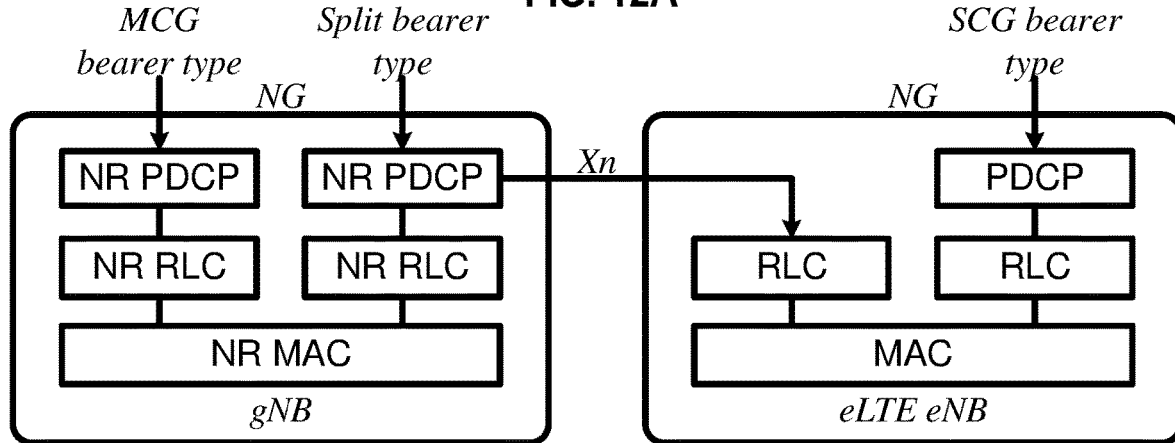
Figure 12C:
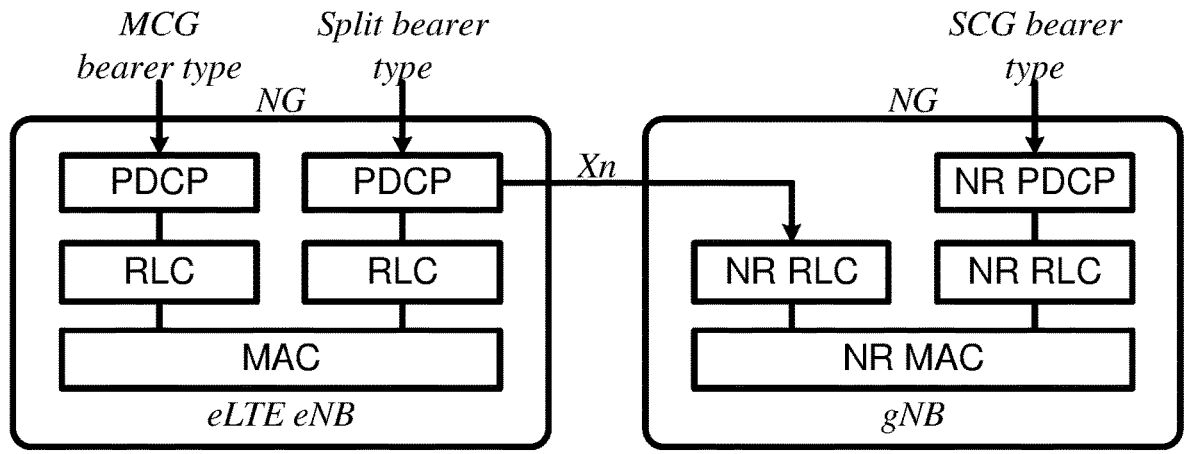

FIG. 12A, FIG. 12B, and FIG. 12C are example diagrams for radio protocol structures of tight interworking bearers as per an aspect of an embodiment of the present disclosure. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three example bearers including an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the disclosure.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

Figure 13A:
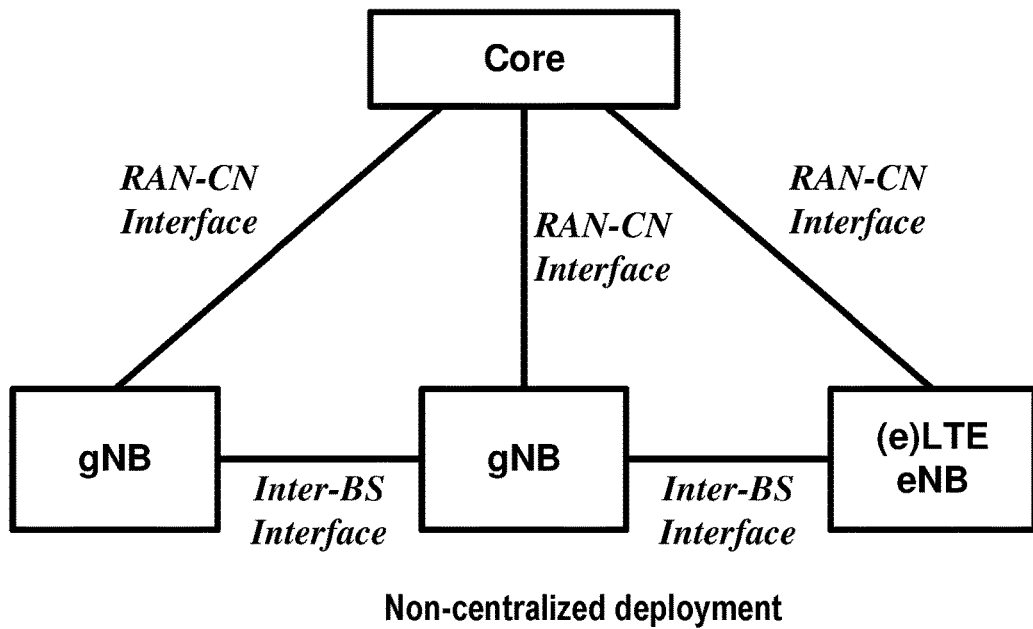
FIG. 13A and FIG. 13B are example diagrams for gNB deployment scenarios as per an aspect of an embodiment of the present disclosure.
Figure 13B:
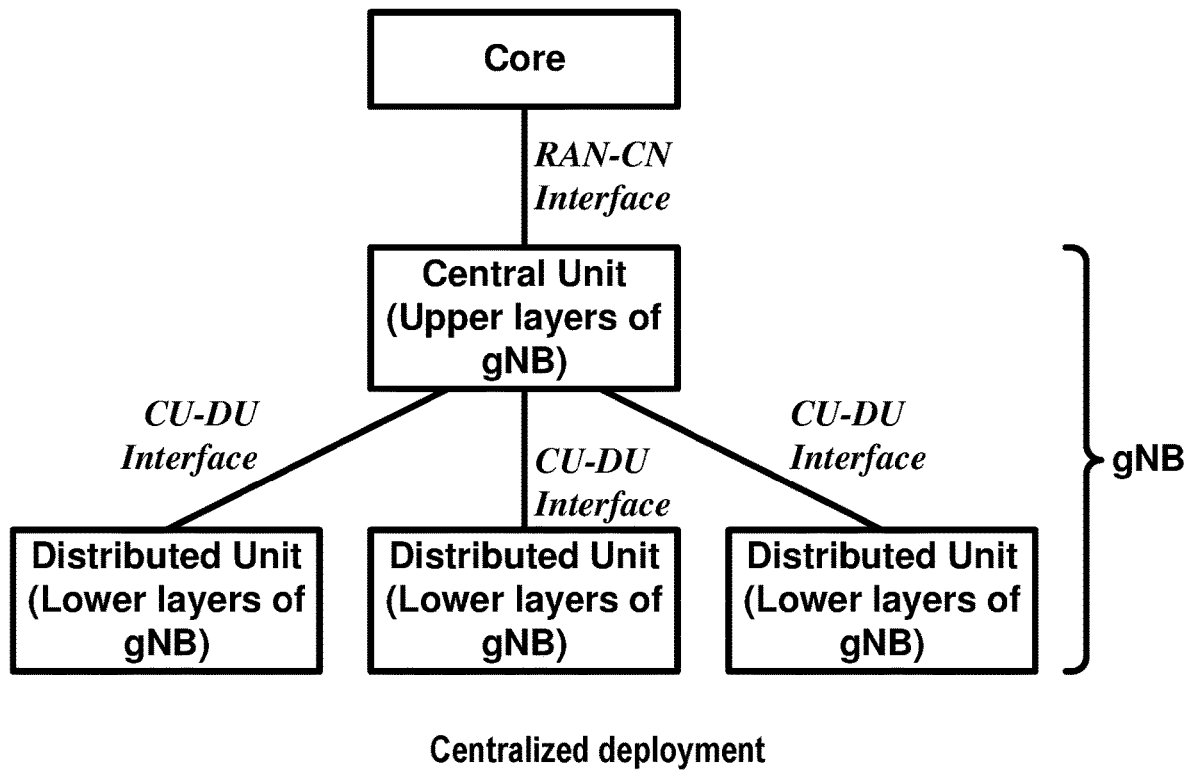

FIG. 13A and FIG. 13B are example diagrams for gNB deployment scenarios as per an aspect of an embodiment of the present disclosure. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
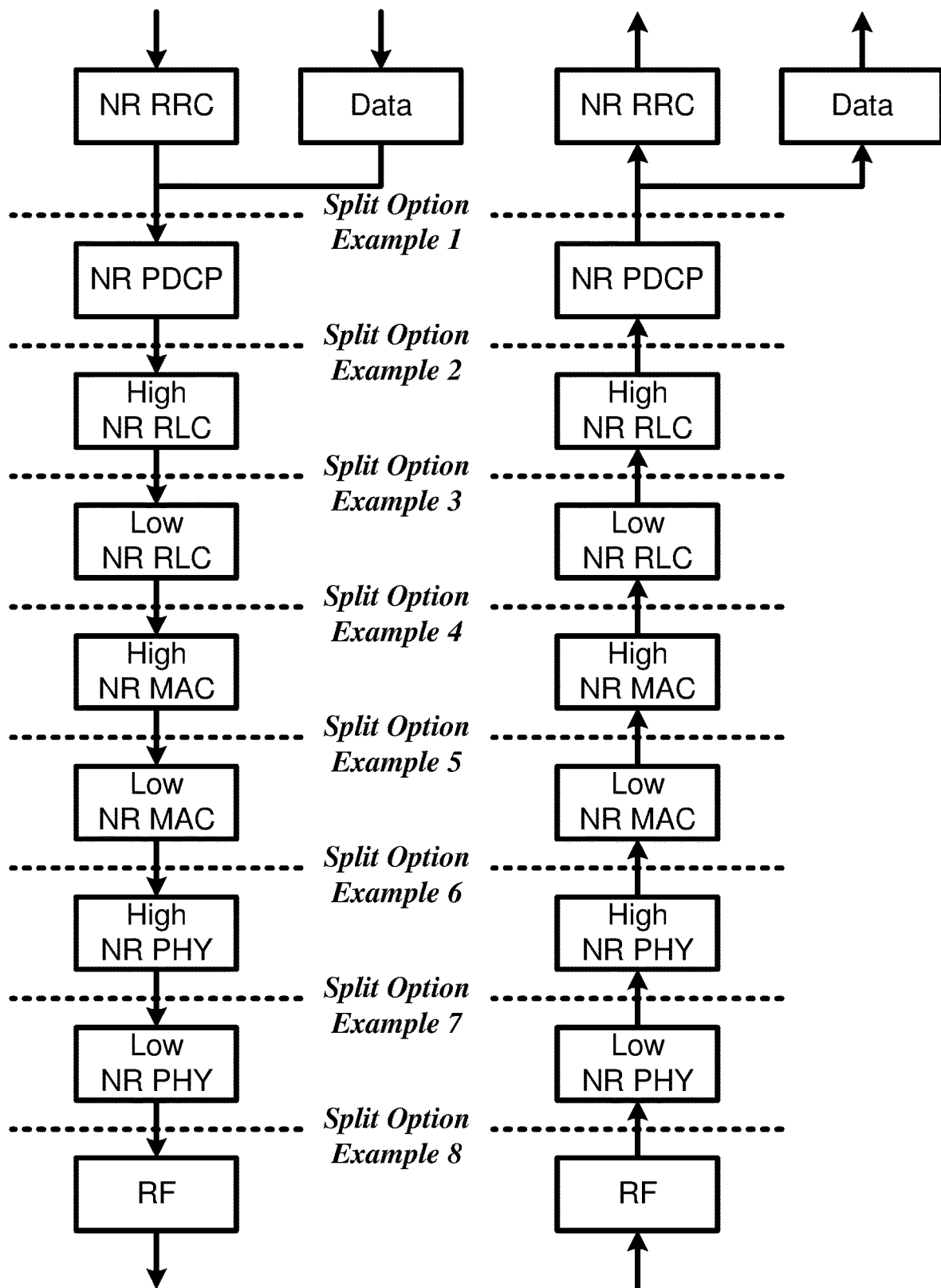
FIG. 14 is an example diagram for functional split option examples of the centralized gNB deployment scenario as per an aspect of an embodiment of the present disclosure.

FIG. 14 is an example diagram for different functional split option examples of the centralized gNB deployment scenario as per an aspect of an embodiment of the present disclosure. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, a DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g.

NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and a user/device accesses an increasing number and variety of services, e.g. video delivery, large files, images. This requires provisioning a high data rates and capacity in the network to meet customers' expectations. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an option for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of control information for the PDSCH may be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

A NR (New Radio) may support a multi-beam operation. In an example, a gNB, a bae station in the NR, operating on a high frequency band may broadcast one or more NR synchronization signal (SS) using different transmitting beams in different radio resources in time and frequency.

An SS may be based on Cyclic Prefix-Orthogonal Frequency Division Multiplexing (CP-OFDM). The SS may comprise at least two types of synchronization signals; NR-PSS (Primary synchronization signal) and NR-SSS (Secondary synchronization signal). NR-PSS may be defined at least for initial symbol boundary synchronization to the NR cell. NR-SSS may be defined for detection of NR cell ID or at least part of NR cell ID. NR-SSS detection may be based on the fixed time/frequency relationship with NR-PSS resource position irrespective of duplex mode and beam operation type at least within a given frequency range and CP overhead. Normal CP may be supported for NR-PSS and NR-SSS.

The NR may comprise at least one physical broadcast channel (NR-PBCH). When a gNB transmit (or broadcast) the NR-PBCH, a UE may decode the NR-PBCH based on the fixed relationship with NR-PSS and/or NR-SSS resource position irrespective of duplex mode and beam operation type at least within a given frequency range and CP overhead. NR-PBCH may be a non-scheduled broadcast channel carrying at least a part of minimum system information with fixed payload size and periodicity predefined in the specification depending on carrier frequency range.

In single beam and multi-beam scenarios, NR may comprise an SS block that may support time (frequency, and/or spatial) division multiplexing of NR-PSS, NR-SSS, and NR-PBCH. A gNB may transmit NR-PSS, NR-SSS and/or NR-PBCH within an SS block. For a given frequency band, an SS block may correspond to N OFDM symbols based on the default subcarrier spacing, and N may be a constant. The signal multiplexing structure may be fixed in NR. A UE may identify at least OFDM symbol index, slot index in a radio frame and radio frame number from an SS block.

A NR may support an SS burst comprising one or more SS blocks. An SS burst set may comprise one or more SS bursts. For example, a number of SS bursts within a SS burst set may be finite. From physical layer specification perspective, NR may support at least one periodicity of SS burst set. From UE perspective, SS burst set transmission may be periodic, and UE may assume that a given SS block is repeated with an SS burst set periodicity.

Within an SS burset set periodicity, NR-PBCH repeated in one or more SS blocks may change. A set of possible SS block time locations may be specified per frequency band in an RRC message. The maximum number of SS-blocks within SS burst set may be carrier frequency dependent. The position(s) of actual transmitted SS-blocks may be informed at least for helping CONNECTED/IDLE mode measurement, for helping CONNECTED mode UE to receive downlink (DL) data/control in one or more SS-blocks, or for helping IDLE mode UE to receive DL data/control in one or more SS-blocks. A UE may not assume that the gNB transmits the same number of physical beam(s). A UE may not assume the same physical beam(s) across different SS-blocks within an SS burst set. For an initial cell selection, UE may assume default SS burst set periodicity which may be broadcast via an RRC message and frequency band-dependent. At least for multi-beams operation case, the time index of SS-block may be indicated to the UE.

For CONNECTED and IDLE mode UEs, NR may support network indication of SS burst set periodicity and information to derive measurement timing/duration (e.g., time window for NR-SS detection). A gNB may provide (e.g., via broadcasting an RRC message) one SS burst set periodicity information per frequency carrier to UE and information to derive measurement timing/duration if possible. In case that one SS burst set periodicity and one information regarding timing/duration are indicated, UE may assume the periodicity and timing/duration for all cells on the same carrier. If a gNB does not provide indication of SS burst set periodicity and information to derive measurement timing/duration, a UE may assume a predefined periodicity, e.g., 5 ms, as the SS burst set periodicity. NR may support set of SS burst set periodicity values for adaptation and network indication.

For initial access, UE may assume a signal corresponding to a specific subcarrier spacing of NR-PSS/SSS in a given frequency band given by a NR specification. For NR-PSS, a Zadoff-Chu (ZC) sequence may be employed as a sequence for NR-PSS. NR may define at least one basic sequence length for a SS in case of sequence-based SS design. The number of antenna port of NR-PSS may be 1. For NR-PBCH transmission, NR may support a fixed number of antenna port(s). A UE may not require a blind detection of NR-PBCH transmission scheme or number of antenna ports. A UE may assume the same PBCH numerology as that of NR-SS. For the minimum system information delivery, NR-PBCH may comprise a part of minimum system information. NR-PBCH contents may comprise at least a part of the SFN (system frame number) or CRC. A gNB may transmit the remaining minimum system information in shared downlink channel via NR-PDSCH.

A NR may support contention-based random access (CBRA) and contention-free random access (CFRA) procedures. The CBRA may comprise a four-step random access (RA) procedure which may comprise: RA preamble (RAP) transmission from a user equipment (UE) to a base station in NR, referred to as gNB, random access response (RAR) transmission from the gNB to the UE, scheduled transmission of one or more transport blocks (TBs) from the UE to the gNB, and contention resolution as illustrated in FIG. 15(a). The CFRA may comprise the first two steps of CBRA, which may comprise the RAP transmission by a UE and RAR transmission by a gNB. In the CFRA, gNB may assign a dedicated RAP to a UE via one or more radio resource control (RRC) messages or via a downlink control channel, e.g., PDCCH, EPDCCH, or MPDCCH, in the form of downlink control information (DCI), e.g., DCI format 1A, 6-1A, or 6-1B in LTE. The dedicated RAP may result in completing a CFRA at the second step of CBRA by skipping a contention resolution as illustrated in FIG. 15(b).

For the RAP transmission, gNB may transmit one or more radio resource control (RRC) messages and/or one or more control messages, e.g., downlink control information (DCI) via PDCCH, for indicating a random access channel (RACH) configuration which may comprise at least one or more physical random access channel (PRACH) resources for transmitting a RAP, a RAP format, or RACH sequence information for generating a RAP for transmitting to the gNB.

For CBRA, a gNB may broadcast RACH configurations, e.g., rach-ConfigCommon and prach-Config broadcast via as a part of system information block, possibly per beam via NR-PBCH. The UE may randomly determine a RAP from RACH sequences generated based on the RACH configuration and may transmit the determined RAP via one or more RACH radio resources configured by the RACH configuration.

In CBRA, the random selection of RAP from the RACH sequences may result in the case that multiple UEs may transmit the same RAP via the same RACH radio resource(s). A gNB that may receive the same RAP from the multiple UEs may or may not detect the RAP. In the CBRA, the contention resolution resulted from the same RAP transmission by multiple UEs may be resolved in the last step of CBRA.

A UE may be configured with CFRA, for example, for handover to a new cell or for adding a secondary cell. For CFRA, the UE may receive the RACH configuration from one or more dedicated message transmitted by a gNB. In an example, for handover, a target base station may transmit, to a source base station, a RACH configuration for a UE. The source base station may transmit an RRC message comprising the RACH configuration to a UE. The RACH configuration may indicate a handover to the target base station with the RACH configuration. For adding a secondary cell, a UE may receive, from a base station, the RACH configuration via a downlink control channel, e.g., PDCCH, EPDCCH, or MPDCCH, in the form of DCI, and/or an RRC message.

For CFRA, the preamble to transmit by a UE may be explicitly indicated by a gNB. In an example, for handover, one or more RRC messages transmitted by a gNB for CFRA may comprise a dedicated RACH configuration for CFRA, e.g., RACH-ConfigDedicated in LTE. The dedicated RACH configuration may comprise at least a dedicated preamble index, e.g., ra-PreambleIndex, and/or RACH configuration index, e.g., ra-PRACH-MaskIndex.

In an example, for adding a secondary cell, one or more control messages transmitted by a gNB via a physical layer control channel may be scrambled by a cell radio network temporary identifier (C-RNTI) assigned to a UE. The one or more control messages may comprise at least a carrier indicator, e.g., 0 or 3 bits assigned for indicating a carrier in DCI format 1A in LTE, a preamble index, e.g., 6 bits assigned for indicating Preamble index in DCI format 1A in LTE, or RACH configuration index, e.g., 4 bits assigned for indicating PRACH Mask Index in DCI format 1A in LTE.

For the case of CFRA, a preamble may be dedicated for a UE to prevent multiple UEs from transmitting the same RAP. A gNB may select a RAP for CFRA from sequences outside one or more RAP sequence sets used for CBRA and/or may select a RAP for CFRA from one or more reserved sequences in one or more RAP sequences used for CBRA and CFRA.

A gNB may transmit a medium access control (MAC) packet data unit (PDU) comprising one or more RA responses (RARs) to the UE in response to reception of a RAP that a UE transmits. A UE may monitor the physical-layer downlink control channel (PDCCH) for RARs identified by a random access RNTI (RA-RNTI) in a RA response window which may starts at the subframe, slot, or mini-slot that comprises the end of a RAP transmission plus a time offset, e.g., three subframes or zero subframes. The size of the RA response window may be configurable, e.g., ra-ResponseWindowSize.

A gNB may transmit a response corresponding to the UE's RAP transmission. The response may be scrambled with the RA-RNTI. A UE may identify, based on the RA-RNTI, whether an RAR received from a gNB is for the UE or not. The RA-RNTI may be determined at least based on a time and frequency radio resource where a UE transmits a RAP, which may result in a plurality of UEs having the same RA-RNTI. For example, in LTE, a UE may compute the RA-RNTI associated with the PRACH in which the UE transmits a RAP as:

$$RA\text{-}RNTI=1+t\_id+10*f\_id$$

where t_id is the index of the first subframe of the specified PRACH ($0 \le t\_id < 10$), and f_id is the index of the specified PRACH within that subframe, in ascending order of frequency domain ($0 \le f\_id < 6$) except for NB-IoT UEs, BL UEs or UEs in enhanced coverage. NB-IoT, BL-UE, and/or a UE in enhanced coverage may employ different formulas for RA-RNTI calculations. In NR, the RA-RNTI may comprise at least an subframe index of a specified PRACH (time occasion) and a frequency index of the specified PRACH within the subframe. In an example, for BL UEs and UEs in enhanced coverage, RA-RNTI associated with the PRACH in which the Random Access Preamble is transmitted, may be computed as:

$$RA\text{-}RNTI=1+t\_id+10*f\_id+60*(SFN\_id \bmod(Wmax/10))$$

where t_id is the index of the first subframe of the specified PRACH ($0 \le t\_id < 10$), f_id is the index of the specified PRACH within that subframe, in ascending order of frequency domain ($0 \le f\_id < 6$), SFN_id is the index of the first radio frame of the specified PRACH, and Wmax is 400, maximum possible RAR window size in subframes for BL UEs or UEs in enhanced coverage. For NB-IoT UEs, the RA-RNTI associated with the PRACH in which the Random Access Preamble is transmitted, may be computed as:

$$RA\text{-}RNTI=1+\mathrm{floor}(SFN\_id/4)$$

where SFN_id is the index of the first radio frame of the specified PRACH.

Figure 16:
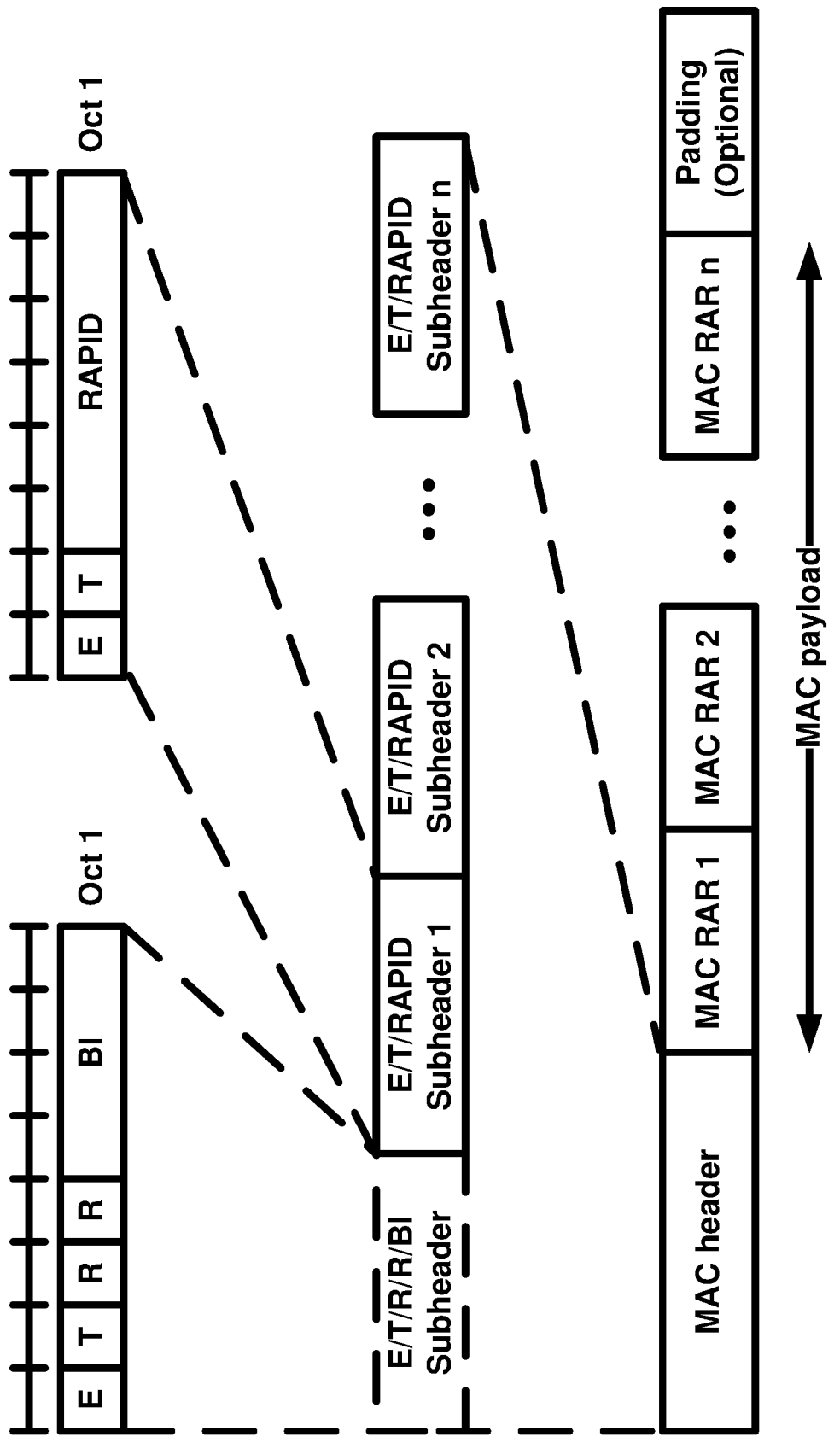
FIG. 16 is an example MAC PDU format of an example of MAC PDU comprising a MAC header and MAC RARs for four-step RA procedure as per an aspect of an embodiment of the present disclosure.

In response to transmitting a RAP, a UE may start to monitor PDCCH for at least one RAR detection. A UE may stop monitoring for RAR(s) after decoding of a MAC PDU for a RAR comprising a RAP identifier (RAPID) that matches the RAP transmitted by the UE. The MAC PDU may comprise one or more MAC RARs and a MAC header that may comaprise a subheader having a backoff indicator (BI) and one or more subheaders that comprise RAPIDs. FIG. 16 illustrates an example of a MAC PDU comprising a MAC header and MAC RARs. If a RAR comprises a RAPID corresponding to the RAP that a UE transmits, the UE may employ one or more parameters in the RAR, e.g., a timing advance (TA) command, a UL grant, and a Temporary C-RNTI (TC-RNTI) in LTE, to a subsequent transmission. FIG. 17 illustrates examples of MAC RAR comprising a TA command, a UL grant, and a TC-RNTI.

For CFRA, a UE may receive an RAR comprising an RAP dedicated (preassigned) to the UE that is different from RAPs assigned to other UEs. In this case, in response to receiving an RAR comprising a RAPID corresponding to the transmitted RAP, a UE may complete the CFRA procedure. There may be no need to handle contention for CFRA since the UE may have a RAP assigned by a gNB.

For CBRA, if a UE receives an RAR comprising an RAPID corresponding to the UE's transmitted RAP, the UE may adjust UL time alignment by employing the TA value corresponding to the TA command in the received RAR and may transmit one or more TBs to a gNB employing the UL resources indicated by the UL grant in the received RAR. The TBs that a UE transmits may comprise RRC signaling, such as RRC connection request, RRC connection Re-establishment request, or RRC connection resume request, and a UE identity (e.g., TC-RNTI), as the identity is used as part of the contention-resolution mechanism in the last step of the CBRA.

The last step of the CBRA procedure may comprise a DL message transmitted by a gNB for contention resolution. For the case of the same RAP transmissions by multiple UEs, the multiple UEs may receive the same RAR with the same TC-RNTI in the second step of CBRA. The contention resolution in the last step may be to ensure that a UE does not incorrectly use another UE Identity. The contention resolution mechanism may be based on either C-RNTI on PDCCH or Contention Resolution Identity on DL-SCH depending on whether a UE has a C-RNTI or not. If a UE has C-RNTI, upon detection of C-RNTI on the PDCCH, the UE may determine the success of RA procedure. If a UE does not have C-RNTI pre-assigned, the UE may monitor DL-SCH associated with TC-RNTI that a gNB transmits in a RAR of the second step and may compare the identity in the data transmitted by the gNB on DL-SCH with the identity that the UE transmits. If the two identities are identical, the UE may determine the success of RA procedure and promote the TC-RNTI to the C-RNTI.

The last step in the RA procedure may allow Hybrid automatic repeat request (HARQ) retransmission. A UE may start mac-ContentionResolutionTimer when the UE transmits one or more TBs to a gNB in the third step and may restart mac-ContentionResolutionTimer at a HARQ retransmission. When a UE receives data on the DL resources identified by C-RNTI or TC-RNTI in the last step, the UE may stop the mac-ContentionResolutionTimer. If the UE does not detect the contention resolution identity that matches to the identity transmitted by the UE in the third step, the UE may determine the failure of RA procedure and discard the TC-RNTI. If mac-ContentionResolutionTimer expires, the UE may determine the failure of RA procedure and discard the TC-RNTI. If the contention resolution is failed, a UE may flush the HARQ buffer used for transmission of the MAC PDU and may restart the four-step RA procedure from the first step. The UE may delay the subsequent RAP transmission by the backoff time randomly selected according to a uniform distribution between 0 and the backoff parameter value corresponding the BI in the MAC PDU for RAR.

In the RA procedure, the usage of the first two steps may be to obtain UL time alignment and an UL grant for a UE. The UL time alignment may not be necessary in one or more scenarios. For example, in small cells or for stationary wireless devices, the process for acquiring the UL time alignment may not be necessary if a TA value is zero (e.g., small cells) or a stored TA value from the last TAC (in RAR and/or in MAC CE) may serve for the current RA (stationary wireless device). For the case that a UE may be in RRC connected with a valid TA value and no resource configured for UL transmission, the UL time alignment may not be necessary when the UE needs to obtain an UL grant.

In a multi-beam operation, gNB may perform a downlink beam sweep to provide coverage for DL synchronization signals (SSs) and common control channels. To enable UEs to access the cell, the UEs may perform the similar sweep for UL direction.

In the single beam scenarios, a gNB may configure time-repetition within one SS block in a wide beam. In multi-beam scenarios, a gNB may configure one or more SS blocks with multiple transmitting (Tx) beams such that a UE identifies at least one of OFDM symbol index, slot index in a radio frame, or radio frame number from an SS block.

In NR with multi-beam operation, the SS block may comprise an association between SS blocks and a subset of RACH resources and/or a subset of RAP indices. UE may determine a subset of RACH resources and/or a subset of RAP indices based on DL measurements on SS blocks.

Figure 18:
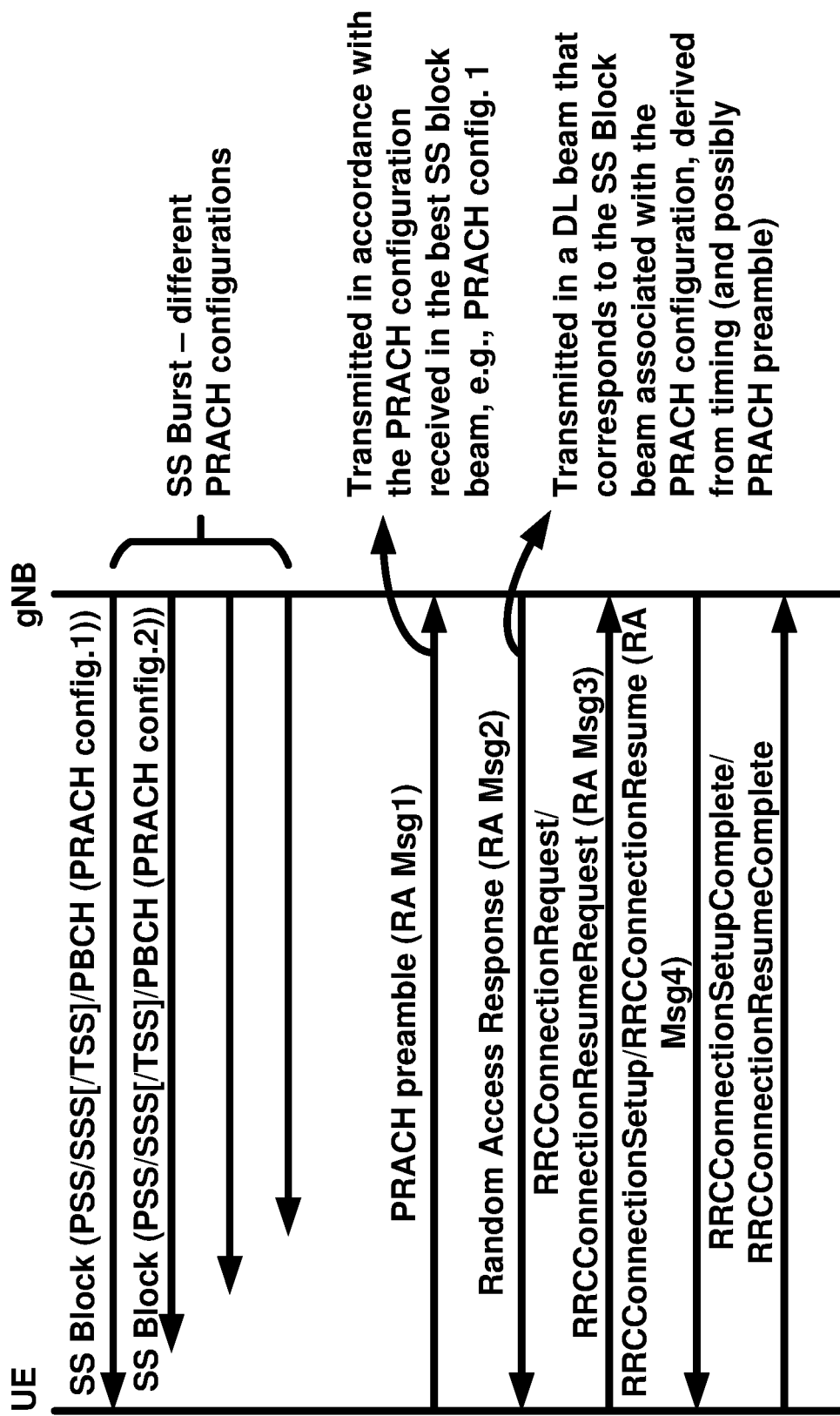
FIG. 18 is an example of the RA procedure comprising broadcasting multiple SS blocks as per an aspect of an embodiment of the present disclosure.

In the multi-beam scenario, a gNB may repeat a transmission of PSS/SSS/PBCH using different Tx beams, e.g., Tx beam sweeping, to provide a DL coverage for supporting cell selection/reselection and initial access procedures. NR may support a SS comprising a tertiary synchronization signal (TSS). The TSS may be employed for indicating one or more differences in the repeated PRACH configurations via one or more beams within an SS Burst. Under the assumption that PBCH carries the PRACH configuration, a gNB may broadcast PRACH configurations possibly per beam with the TSS. FIG. 18 is an example of the RA procedure, where a gNB broadcast multiple SS blocks.

In NR, a gNB may configure an association between DL signal/channel of a SS block, and a subset of RACH resources and/or a subset of preamble indices, for determining a DL Tx beam for transmitting a RAR. In an example, for multiple SS blocks broadcast by a gNB, a UE may measure DL signal/channel of the multiple SS blocks and select one of configured PRACH radio resources associated with one of the multiple SS blocks. The selected PRACH radio resource may be associated with an SS block providing a received signal strength higher than a predefined threshold at the UE. Transmitting a RAP over one of configured PRACH radio resources may indicate a UE's preferred DL Tx beam to a gNB. If the gNB detect the RAP, an RAR corresponding to the RAP may be transmitted using the DL Tx beam that the UE prefers.

Figure 19:
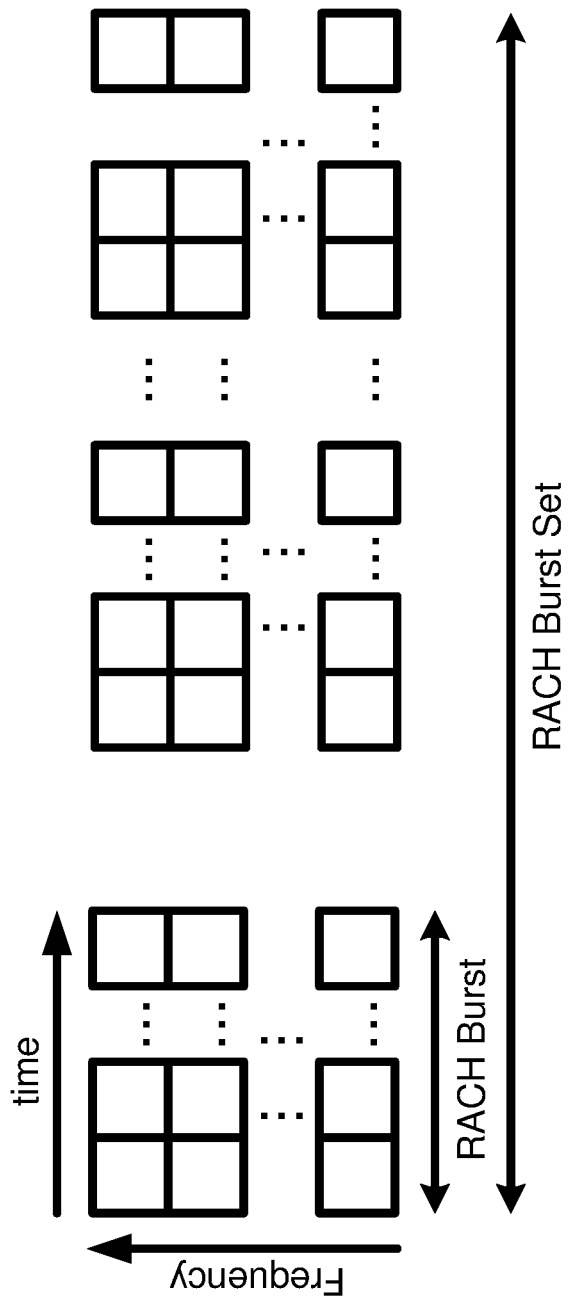
FIG. 19 is an example of RACH Occasion, RACH Burst and RACH Burst Set as per an aspect of an embodiment of the present disclosure.

In a multi-beam system, a gNB may configure different types of PRACH resources associated with SS blocks and/or DL beams. In NR, a PRACH transmission occasion may be defined as the time-frequency radio resource on which a UE transmits a preamble using the configured PRACH preamble format with a UE Tx beam and for which gNB performs PRACH preamble detection. One PRACH occasion may be used to cover the Tx/Rx beam non-correspondence case at TRP (transmission and reception point) and/or UE. gNB may perform RX sweep during PRACH occasion as UE TX beam alignment is fixed during single occasion. A PRACH burst may mean a set of PRACH occasions allocated consecutively in time domain, and a PRACH burst set may mean a set of PRACH bursts to enable full RX sweep. FIG. 19 illustrates an example of configured PRACH occasion, PRACH burst, and PRACH burst set.

There may be an association between SS blocks (DL signal/channel) and PRACH occasion and a subset of PRACH preamble resources. One PRACH occasion may comprise a set of preambles. In multi beam operation, the gNB may need to know which beam or set of beams it may use to transmit an RAR and the preambles may be used to indicate that.

The timing from SS block to the PRACH resource may be indicated in the MIB. In an example, different TSS may be used for different timings such that the detected sequence within TSS indicates the PRACH resource. This PRACH configuration may be specified as a timing relative to the SS block, and may be given as a combination of the payload in the MIB and another broadcast system information.

Association between SS block and a subset of RACH resources and/or a subset of preamble indices may be configured so that TRP may identify a DL beam (e.g., a preferred DL beam) for a UE according to resource location or preamble index of received preamble. An association may be independent and at least either a subset of RACH resources or subset of preamble indices may not be allowed to be associated with multiple SS blocks.

PRACH resources may be partitioned on SS-blocks basis in the multiple beam operation. There may be one to one and/or many to one mapping between SS-blocks and PRACH occasions. FIG. 20 illustrates an example of TDD (FIG. 20(a)) and FDD (FIG. 20(b)) based one to one mapping and multi-to-one mapping (FIG. 20(c)) between SS-blocks and PRACH occasions.

UE may detect SS-block based on DL synchronization signals and differentiate SS-blocks based on the time index. With one-to-one mapping of beam or beams used to transmit SS-block and a specific PRACH occasion, the transmission of PRACH preamble resource may be an indication informed by a UE to gNB of the preferred SS-block (that may indicate the preferred DL Tx beam employed to transmit the preferred SS-block). This way the PRACH preamble resources of single PRACH occasion may correspond to specific SS-block and mapping may be done based on the SS-block index. There may be one to one mapping between an SS-block beam and a PRACH occasion. There may not be such mapping for the SS-block periodicity and RACH occasion periodicity.

Depending on the gNB capability (e.g. the used beamforming architecture, analog/hybrid/digital beamforming), there may not be one to one mapping between a SS-block and a RACH occasion. In case beam or beams used for transmitting SS-block and receiving during RACH occasion do not correspond directly, e.g., gNB may form receive beams that cover multiple SS-blocks beams, the preambles of PRACH occasion may be divided between the different SS-blocks in a manner that a subset of PRACH preambles map to specific SS-block.

Figure 21:
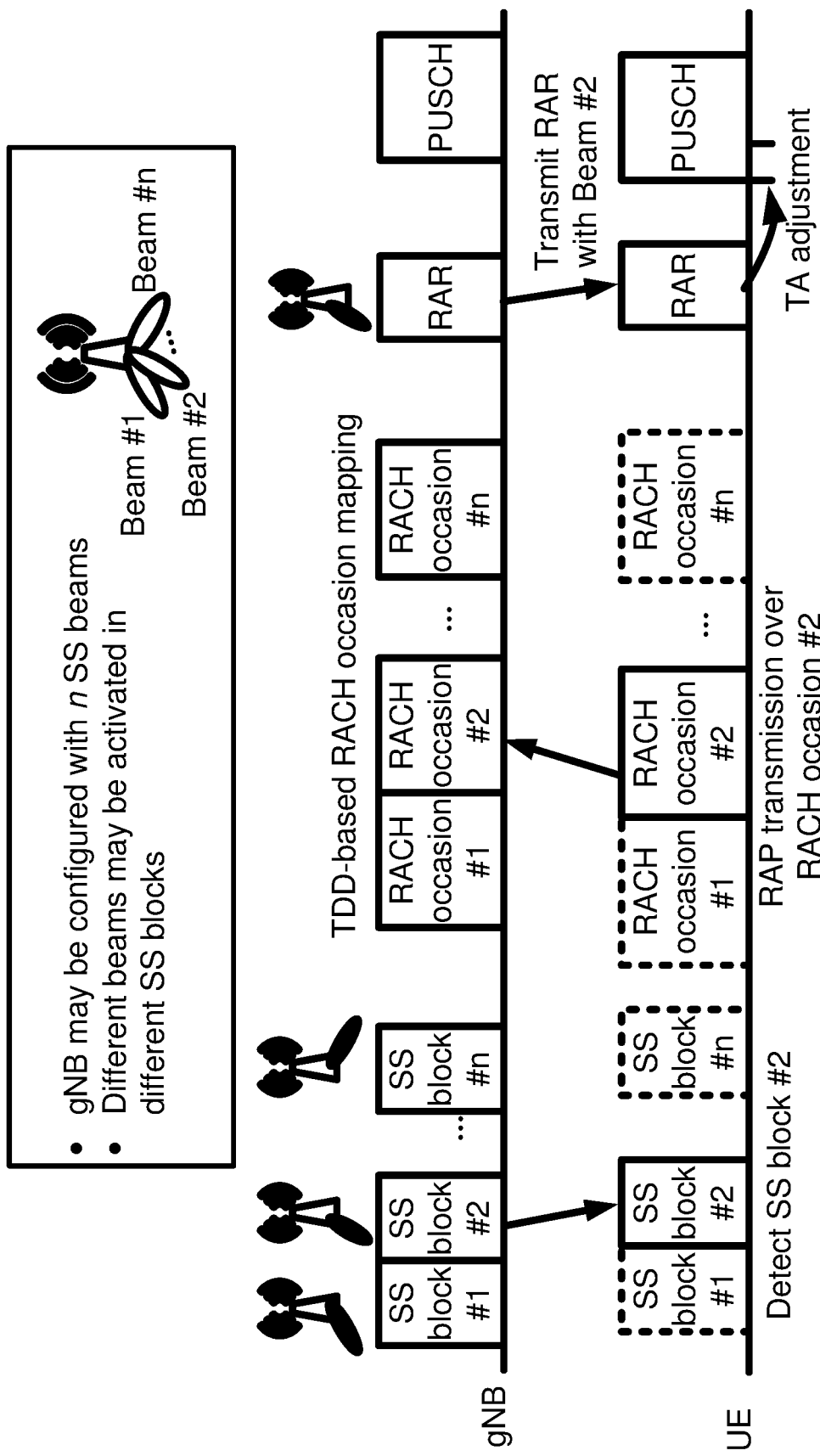
FIG. 21 is an example of RA procedure with multi-beam as per an aspect of an embodiment of the present disclosure; a UE detects the second SS blocks and thereby transmits a preamble on a RACH resource corresponding to the second SS block to inform gNB of the preferred beam. gNB responds with a RAR using the beam that the UE prefers.

In the multi-beam RACH scenario, based on the mapping between DL beams transmitting SS blocks and PRACH resources, e.g. time/frequency slot and possibly preamble partitioning, a UE may be under the coverage of a given DL beam or at least a subset of them in a cell. That may enable a gNB to transmit an RAR in this DL beam and/or perform a beam sweeping procedure e.g. not transmitting the same RAR message in possible beams (e.g. transmitting the RAR in a single beam as in the figure below) as illustrated in FIG. 21. A gNB may broadcast one or more system information comprising the mapping periodically, e.g., for a RRC idle UE, or may transmit one or more UE-specific RRC messages comprising the mapping based upon a request, e.g., for a RRC connected UE.

With beam-specific PRACH resources, a gNB DL TX beam may be associated with a subset of preambles. The beam specific PRACH preambles resources may be associated with DL Tx beams that are identified by periodical beam and/or CSI-RS, e.g., CSI-RS for L3 Mobility (same signals may be used for L2 beam management/intra-cell mobility as well). A UE may detect the beams without RRC configuration, e.g., reading the beam configuration from minimum SI (MIB/SIB).

In an example, a gNB may transmit to a UE one or more messages comprising configuration parameters of one or more cells. The configuration parameters may comprise parameters of a plurality of CSI-RS signal format and/or resources. The configuration parameters may comprise one or more parameters for indicating at least one of CSI-RS periodicity, CSI-RS subcarriers (e.g. resource elements), or CSI-RS sequence. Based on the configuration parameters of CSI-RS, a UE may determine when to (e.g., time) and/or where (e.g., frequency) to measure a pathloss (or perform a radio link measurement) of the configured CSI-RS.

Figure 22B:
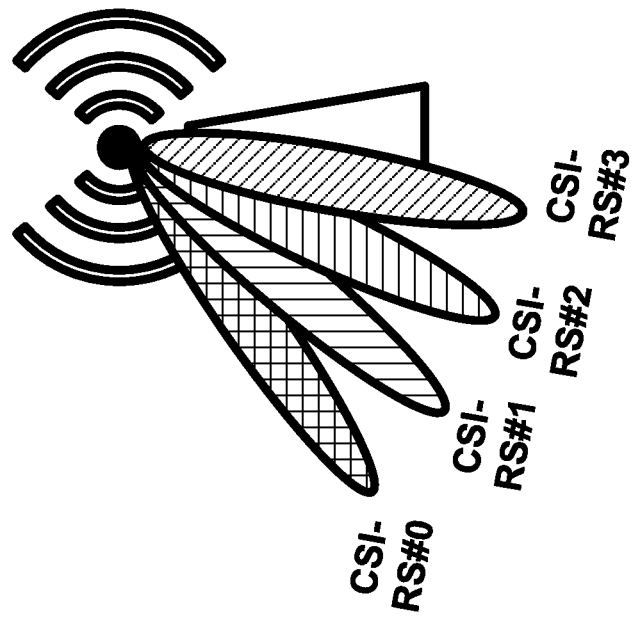
FIG. 22A and FIG. 22B are examples of one or more beams configured with SS block (FIG. 22A) and CSI-RS (FIG. 22B) as per an aspect of an embodiment of the present disclosure.
Figure 22A:
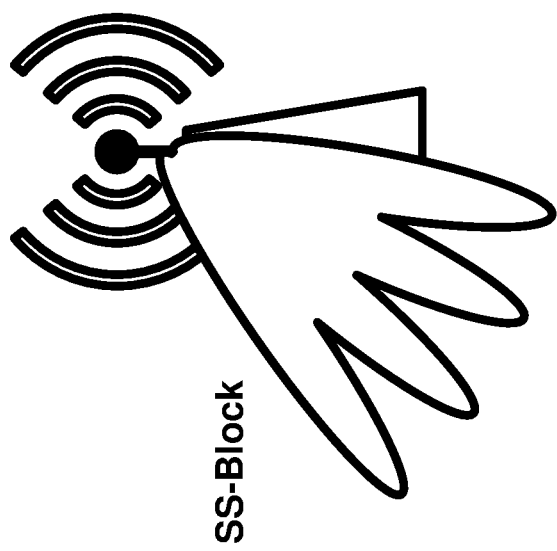

The PRACH resource mapping to specific beams may use SS-block association. Specific beams may be associated with the beams used for transmitting SS-block as illustrated in FIG. 22. In FIG. 22(a), gNB may transmit SS-block using one or multiple beams (in case of analogue/hybrid beamforming), but individual beams may not be detected. From the UE perspective, this may be a single beam transmission. In FIG. 22(b), gNB may transmit CSI-RS (for Mobility) using individual beams associated with specific SS-block. A UE may detect individual beams based on the CSI-RS.

In an example, a gNB may transmit to a UE the one or more messages comprising one or more parameters for indicating the correspondence between SS blocks and CSI-RS signals. The one or more messages may be RRC connection setup message, RRC connection resume message, and/or RRC connection reconfiguration message.

In an example, a UE in RRC-Idle mode may not be configured with CSI-RS signals and may receive SS blocks. A UE not configured with CSI-RS may measure a pathloss based on SS signals. A UE in RRC-connected mode, may be configured with CSI-RS signals and may be measure pathloss based on CSI-RS signals. In an example, a UE in RRC inactive mode may measure the pathloss based on SS blocks, e.g. when the UE moves to a different gNB that has a different CSI-RS configuration compared with the serving gNB.

For a handover case, a UE may be configured to measure one or more SS blocks and/or CSI-RS s in a neighboring cell. If at least one of the neighboring cell SS-block measurements triggers a handover request, a source gNB may transmit one or more parameters for indicating at least one preferred beam in a handover request to a target gNB based on the measurements. In response to receiving the at least one preferred beam, the target gNB may transmit at least one beam-specific dedicated RACH resource and/or at least one RAP in the handover command. In an example, the target gNB may provide a set of dedicated resources e.g. one for at least one SS-block in the handover command. The UE may transmit the at least one RAP corresponding to the preferred DL beam in the target cell.

PRACH occasion may be mapped to corresponding SS-block, and a set of PRACH preambles may be divided between beams as illustrated in FIG. 23(a). Similar to mapping of multiple SS-blocks to single PRACH occasion, multiple beams of an SS-block may be mapped to at least one PRACH occasion as illustrated in FIG. 23(b).

If a PRACH occasion is configured with k preambles, and a PRACH occasion is configured to be SS-block specific, the k preambles may be used to indicate the specific SS-block. In this case, there may be N PRACH occasions corresponding to N SS-blocks. If multiple SS-blocks are mapped to single PRACH occasion, then the preambles may be divided between SS-blocks and depending on the number of SS-blocks, the available preambles per SS-block may be K/N (K preambles, N SS-blocks). If K SS-block specific preambles are divided between CSI-RS beams in the corresponding PRACH occasions, the number of available preambles per beam may be determined by the K preambles/number of beams. If the preambles are partitioned in SS-block specific manner, the UE may indicate preferred SS-block but not the preferred individual DL TX beam to gNB.

The network may configure mapping/partitioning PRACH preamble resources to SS-blocks and/or to individual beams. A UE may determine the used partitioning of PRACH preambles, as much as possible, e.g. based on the PRACH configuration.

Beam-specific PRACH configurations may be configurable when a gNB uses analog RX beamforming. In that case, when a UE transmits, for example, a preamble in a beam-specific time/frequency slot associated with one or multiple SS Block transmissions, then the gNB may use the appropriate RX beamforming when receiving the preamble in that time/frequency slot and use the corresponding DL beam when transmitting the RAR. Hence, beam-specific PRACH configurations may allow the gNB to direct its Rx beamforming in the direction of the same beam when monitoring the associated PRACH resources.

NR may support the CFRA with one or more RACH resources dedicated for the CFRA for one or more cases such as handover, DL data arrival, positioning and obtaining timing advance alignment for a secondary TAG.

For the CFRA case, NR may allow a UE to perform multiple RAP transmissions before the end of a RAR window. A UE may be configured to transmit multiple RAPs over dedicated multiple RACH transmission occasions in time domain. For example, a UE may perform the multiple RAPs transmission prior to the end of a monitored RAR window. The time resource employed for CFRA (e.g., dedicated RACH in time domain for CFRA) may be different from the time resources of CBRA. A UE may transmit the multiple RAPs with same or different UE TX beams. Based on the multiple RAP transmissions, a UE and/or gNB without Tx/Rr beam correspondence may find to find the Tx/Rx beam correspondence. The multiple RAP transmission may result in increasing the success probability of preamble transmission.

A UE may skip one or more RAP transmissions on one or more configured PRACH radio resources. For example, a UE may determine whether to transmit a RAP on a PRACH radio resource based on a DL measurement on one or more SS blocks and/or CSI-RS s associated with the PRACH radio, e.g., the UE may skip a RAP transmission on a PRACH radio resource if a DL measurement on a SS block associated with the PRACH radio resource is below a threshold. The threshold may be predefined by the UE.

In an example, a gNB may configure a threshold limiting a number of RAP transmissions that a UE may perform before the end of a RAR window. The threshold may be predefined. The gNB may transmit the threshold along with a RACH configuration for CFRA, e.g., via one or more broadcast messages, one or more RRC messages dedicated for a UE, or via one or more PDCCH orders. A UE may perform a number of RAP transmissions until the number of RAP transmission is equal to or less than the threshold. The UE may transmit the same or different RAP during the multiple RAP transmissions depending on the association between RACH transmission occasions and RAP indices configured by RACH configuration.

For the case that multiple RAP transmissions are allowed in the CFRA, a gNB may indicate which one or more of the beams employed for RAP transmission is preferable for a subsequent transmission. For example, a gNB may select a RAP transmission that provides the best reception of RAP transmissions at the gNB. For example, a gNB may select a RAP transmission by comparing a reception level of RAP transmissions with a predefined threshold. For example, the predefined threshold may be a reception level at the gNB that may enhance a successful detection of RAP. If there is a RAP transmission that provides a received signal strength higher than the threshold, the gNB may select the RAP corresponding to the RAP transmission.

For example, an indication of preferred RAP transmission among multiple RAP transmissions may increase a success rate of detection and/or decoding probability in the subsequent DL and UL transmissions. For example, a gNB may employ an UL-RX antenna receiving the preferred RAP transmission for the subsequent UL reception. This may result in a higher received signal strength. The DL-TX antenna corresponding to the UL-RX antenna may be employed by the gNB to transmit a DL message with a higher antenna gain in subsequent transmissions. For example, a UE may employ a UL-TX antenna employed to transmit the preferred RAP transmission to provide a gNB with a high received signal strength. The DL-RX antenna corresponding to the UL-TX antenna may be employed by the UE to have a better reception for DL message detection and/or decoding. This increasing success rate may result in reducing signaling overhead (e.g., less number of retransmission).

The indication of the preferred RAP transmission may indicate a selection of one or more UE Tx beams, one or more gNB Rx beams, and/or one or more beam pair links of one or more UE Tx beams and one or more gNB Rx beams. For UE, the indication may be employed for selecting one or more UE's Tx beams and/or one or more gNB's Rx beams for a subsequent transmission. The one or more UE's Tx beams and/or one or more gNB's Rx beams may be selected at least based on the Tx/Rx beam correspondence. For example, a UE may select one or more UE's Tx beams from one or more UE's Rx beams or vice versa based on the UE's Tx/Rx beam correspondence. A gNB may select one or more gNB's Rx beams from one or more gNB's Tx beams or vice versa based on the gNB's Tx/Rx beam correspondence.

In an example, a UE may sweep Tx beams during the multiple RAP transmissions to find a Tx/Rx beam correspondence. If a gNB indicate a first RAP as a preferred RAP transmission, the UE may select a Tx beam, that was used for the preferred RAP transmission, as a beam for a subsequent UL transmission. At the gNB side, the Rx beam employed for receiving the preferred RAP transmission may be selected as the one for receiving the subsequent UL transmission performed by the UE.

Figure 24:
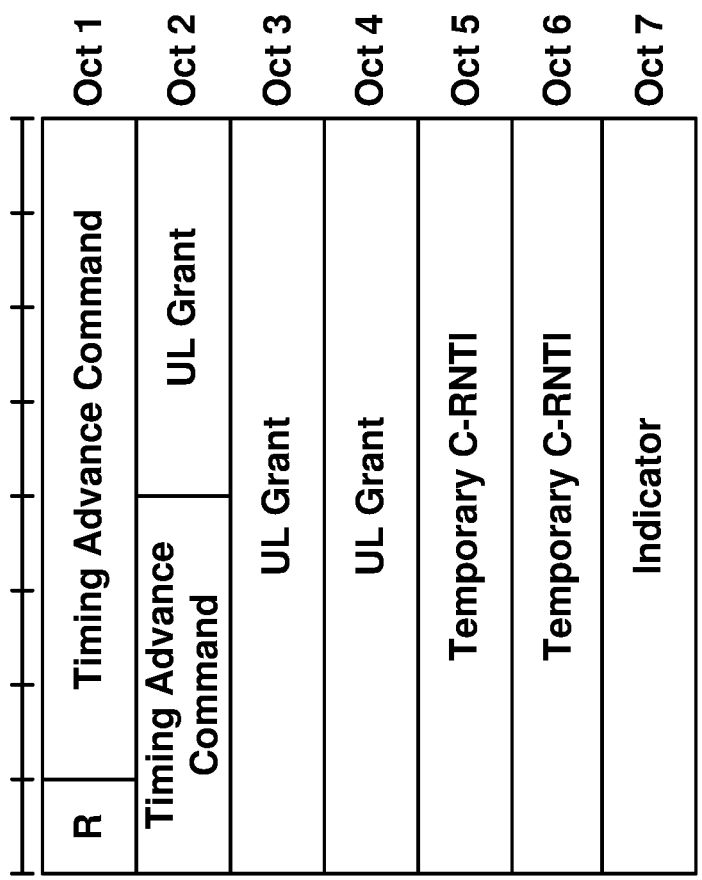
FIG. 24 is an example of a MAC RAR format comprising an indicator indicating a preferred RAP transmission of multiple RAP transmissions as per an aspect of an embodiment of the present disclosure.

There may be one or more ways that a gNB indicate a preferred RAP transmission. In an example, NR may introduce a field for indicating the preferred RAP transmission in a RAR as illustrated in FIG. 24. In this case, the indicator may depend on a radio resource associated with the selected RAP transmission. The radio resource may comprise at least one of SS block index and PRACH resource (tim/frequency/code) of the selected RAP transmission. For example, the indicator may indicate a SS block index, e.g., in terms of SS block subframe, slot, or minislot number, associated with the selected RAP transmission. The indicator may indicate a PRACH resource (time, frequency, code, and/or combination therof), e.g., in terms of PRACH subframe, slot, or minislot number, associated with the selected RAP transmission.

In an example, an RAR may comprise a field indicating received signal strengths of multiple RAP transmissions. For example, gNB may transmit multiple RARs corresponding to the multiple RAPs. An RAR of the multiple RARs may be dedicated to one of multiple RAPs At a gNB, a RAR corresponding to a detected RAP may be scrambled by a RA-RNTI associated to one or more radio resources of the detected RAP transmission, e.g., RA-RNTI may comprise 1+t_id+10*f_id. A UE may identify which an RAR is associated which RAP transmission based on an RA-RNTI of the RAR.

FIG. 25A illustrates an example of RA procedure with multiple RAP transmission and FIG. 25B illustrates an example of a MAC PDU format comprising an indicator indicating a receiving signal strength of a RAP transmission at a gNB. The indicator may comprise an index indicating one of quantized levels of a received signal strength. In an example, in FIG. 25A, a UE may transmit one or more RAPs and determine one or more RA-RNTIs of the one or more RAPs based on the PRACH resources of the one or more RAP transmissions. In response to transmitting the one or more RAPs, a UE may monitor a PDCCH to detect at least one RAR corresponding to one of the oen or more RAP transmissions. In FIG. 25A, the UE may detect at least one RAR during a RAR window with three RA-RNTIs, e.g., RA-RNTI1, RA-RNTI2, and RA-RNTI3, generated from the three RAP transmissions. If there is a RAR scrambled by one of RA-RNTIs associated with multiple RAP transmissions, a UE may check whether there is a MAC subheader comprising a RAPID corresponding to a preamble transmitted during a RAP transmission associated with the one of RA-RNTIs. If the UE identifies such a MAC subheader, the MAC RAR corresponding to the MAC subheader may comprise an indicator indicating a received signal strength at the gNB corresponding to the RAP transmission as illustrated in FIG. 25B. The indicator in a RAR may indicate a received signal strength of a preferred RAP transmission. The indicator may indicate a received signal strength of a RAP transmission associated with a RAPID in the MAC subheader corresponding to the RAR.

In an example, a UE may employ the received signal strength indicated by the indicator for a subsequent UL transmission via resource(s) indicated by an UL grant in RAR. For example, a UE may determine a UL power control value accurately based on the indication. The accurate UL power control may reduce signaling overhead, for example, that may be caused by retransmission of data due to insufficient power. For example, A UE may determine an offset of a transmit power for a subsequent transmission based on the indicator. For example, a UE may employ the received signal strength indicated by the indicator in a pathloss calculation. A UE may adjust the DL measurement employed for a pathloss calculation based on the indicator by adding a power offset that may depend on the DL measurement and the received signal strength at gNB indicated by the indicator.

In an example, a gNB may configure multiple RAPs for multiple RAP transmissions. A gNB may configure the association between a RAPID and a RAP transmission (equivalently a PRACH radio resource) via one or more UE-specific RRC messages and/or one or more PDCCH orders. For example, for handover, a target gNB may transmit the association to a UE via a serving gNB. For the CFRA initiated by one or more PDCCH orders, e.g., CFRA for adding a secondary cell, a gNB may transmit the association to a UE via one or more control message, e.g., one or more DCIs and/or UE-specific RRC messages.

A gNB may explicitly indicate an association between a RAPID and a RAP transmission in the one or more UE-specific RRC messages or the one or more PDCCH orders.

For example, a gNB may transmit one or more UE-specific RRC messages comprising a set of RAPIDs along with an association between SS blocks and PRACH radio resources. For example, in the one or more UE-specific RRC messages, each SS block of the SS blocks may comprise configuration parameters indicating one or more corresponding PRACH radio resources and/or one or more corresponding RAPIDs. The number of RAPIDs may be the same to the number of SS blocks (PRACH radio resources, or associations between SS blocks and PRACH radio resources) indicated in the one or more UE-specific RRC messages, and a position (index) of a RAPID in the set may indicate when a UE transmits a RAP (matched to the RAPID). For example, a gNB may assign the first RAPID in the set for a UE to transmit a RAP (corresponding to the first RAPID) over a PRACH radio resource associated with a first SS block firstly transmitted by a gNB. For example, a gNB may assign the second RAPID in the set for a UE to transmit a RAP (corresponding to the first RAPID) over a PRACH radio resource associated with a second SS block secondly transmitted by a gNB. The number of RAPIDs may be the same to the number of PRACH radio resources (e.g., a number of transmission occasions), and a position (index) of a RAPID in the set may indicate when a UE transmits a RAP (matched to the RAPID). For example, a gNB may assign the first RAPID in the set for a UE to transmit a RAP (corresponding to the first RAPID) over a first PRACH radio resource. For example, a gNB may assign the second RAPID in the set for a UE to transmit a RAP (corresponding to the first RAPID) over a second PRACH radio resource.

For the CFRA initiated by one or more PDCCH orders, e.g., CFRA for adding a secondary cell, a DCI corresponding to the one or more PDCCH orders may comprise a field for indicating multiple RAPIDs. For example, depending on the number of configured SS blocks, the DCI may comprise a variable size of the field, e.g., a size of the field may be n*6 bits where n is the number of configured SS blocks, and 6 bits may indicate a RAP index. A UE may receive an association between the configured SS blocks and PRACH radio resources from one or more broadcast messages and may identify a number of configured SS blocks. The UE may identify a boundary of the field in the DCI based on the identified number of configured SS blocks and may map the multiple RAPIDs identified from the field on the PRACH radio resources in the order of bit sequences, e.g., the UE may transmit a RAP corresponding to the first 6 bits in the field on the first PRACH radio resource and may transmit a RAP corresponding to the next 6 bits in the field on the second PRACH radio resource if a gNB configures two SS blocks.

A gNB may implicitly indicate an association between a RAPID and a RAP transmission in the one or more UE-specific RRC messages or the one or more PDCCH orders. In an example, a gNB may transmit the one or more RRC messages or the one or more PDCCH orders comprising one or more parameters indicating a first RAPID. The gNB may assign the first RAPID for a first PRACH radio resource (or a first SS block). A UE may determine a second RAPID for a second PRACH radio resource (or a second SS block) by increasing the first RAPID by a predefined number, e.g., 1. For example, if a gNB assigns and transmit a RAPID=000000 for a first PRACH radio resource (or a first SS block), a UE may transmit a first RAP corresponding to RAPID=000000 on the first PRACH radio resource (or a PRACH radio resource(s) associated with the first SS block) and may transmit a second RAP corresponding to the RAPID=000001 on the second PRACH radio resource (or a PRACH radio resource(s) associated with the second SS block) if the predefined number is 1. A NR specification may define the predefined number. A gNB may transmit the predefined number, which may be configurable by the gNB, along with one or more messages initiating CFRA, e.g., one or more UE-specific RRC messages and/or one or more PDCCH orders. If a UE skips at least one of PRACH radio resource, the UE may determine a RAPID depending on a number of PRACH radio resources that UE skips and the predefined number. For example, a gNB may transmit a binary sequence of RAPID=000000 for a first PRACH radio resource with a predefined number 2. In this case, if a UE starts a RAP transmission from the third PRACH radio resource, the RAPID that the UE select for the RAP transmission may be 000010.

For the case that a gNB may configure multiple RAPs for multiple RAP transmissions, the gNB may indicate a preferred RAP transmission by transmitting a plurality of MAC PDUs comprising a RAPID corresponding to the preferred RAP transmission. A MAC subheader in each of the plurality of MAC PDUs may comprise the RAPID corresponding to the preferred RAP transmission. Each of the plurality of MAC PDUs may be scrambled by an RA-RNTI corresponding to one of the multiple RAP transmissions. For example, when a gNB receives multiple RAPs, e.g., RAP1, RAP2, and RAP3, from a UE, the gNB may transmit multiple RARs scrambled by RA-RNTIs associated with transmissions of the multiple RAPs, e.g., 3 RARs scrambled by RA-RNTI1 of RAP1 transmission, RA-RNTI2 of RAP2 transmission, and RA-RNTI3 of RAP3 transmission. Those multiple RARs may comprise the same RAP ID corresponding to one of the multiple RAPs. The same RAP ID may indicate a preferred RAP transmission. Since the multiple RAPs are assigned to the UE, the UE may identify whether the RARs are for the UE or not based on the RA-RNTIs and RAP IDs. For example, an RAR received by the UE is scrambled by an RA-RNTIs corresponding to one of RAP transmissions performed by the UE and the RAR comprises an RAP ID corresponding to one of RAPs transmitted by the UE, the UE may determine that the received RAR is for the UE. The RA-RNTI used for scrambling an RAR and RAP ID in the RAR may not matched. For example, the RAP ID in the RAR may be sufficient if the RAP ID is corresponding to one of RAPs transmitted by the UE. For example, an RA-RNTI may be sufficient if the RA-RNTIs corresponding to one of RAP transmissions performed by the UE.

Multiple RARs, that are scrambled by different RA-RNTIs, comprising the same RAP ID (corresponding to the preferred RAP transmission) may be efficient for a gNB. For example, for the case that an RAR is not detected by a UE (for example, due to a sudden drop of channel quality), multiple RAR transmissions may increase a detection probability of RARs at the UE.

In an example, FIG. 26 illustrates an example of multiple RAP transmissions and a corresponding MAC RAR format comprising a RAPID in a MAC subheader that indicates a preferred RAP transmission of multiple RAP transmissions. A UE may transmit multiple RAPs assigned by a gNB. The UE may determine multiple RA-RNTIs corresponding to multiple transmissions of the multiple RAPs based on at least time and frequency resources of the multiple transmissions. In response to multiple RAP transmissions, a UE may receive one or more MAC RARs that may be scrambled by RA-RNTIs associated with the multiple RAP transmissions as illustrated in FIG. 26A. The RAR received by the UE may comprise a RAPID in a MAC subhdeader that corresponds to a preferred RAP transmission of multiple RAP transmissions. For example, the UE may receive multiple RARs scrambled by different RA-RNTIs (e.g., each of different RA-RNTIs corresponding to one of the multiple RAP transmissions) and the multiple RARs may comprise the same RAPID indicating a preferred RAP transmission. Since the RAPID is assigned to the UE and the UE determines the multiple RA-RNTIs (based on transmissions of multiple RAPs), the UE may identify whether the received multiple RARs are for the UE. If the UE receive a plurality of MAC RARs within a RAR window, the multiple RARs may comprise the same RAPID in the MAC subheaders as illustrated in FIG. 26B.

In an example, a UE may transmit one or more RAPs during a RA procedure. The UE may receive one or more RARs from a gNB in response to the one or more RAPs. In a legacy system, the one or more RARs may be scrambled by different RA-RNTIs. For example, each of the one or more RARs may be scrambled by an RA-RNTI generated based at least on time and frequency resource indicator of a RAP transmission. At the UE side, a UE does not have information about which RA-RNTIs are employed for which RAR. The UE may perform blind decoding for multiple RA-RNTIs to detect at least one RAR in a downlink control channel during an RAR window. Monitoring for multiple RARs scrambled by different RA-RNTIs may cause increased power consumption in a UE due to increased blind decoding requirements. There is a need to enhance random access procedures to improve battery power consumption and UE processing requirements. Example embodiments enhances random access procedures to improve battery power consumption and UE processing requirements.

In an example, a gNB may transmit one or more RARs scrambled by a first RNTI assigned to a UE for a serving cell, e.g., C-RNTI. A UE may receive the first RNTI, e.g., a C-RNTI, from a gNB before a RA procedure starts. For example, a UE may receive the first RNTI when an RRC state changes to connected from idle (or from inactive), e.g., a UE may promote a TC-RNTI received from a RAR to the first RNTI, e.g., C-RNTI, during a contention resolution of CBRA procedure. A UE may receive the first RNTI, e.g., C-RNTI, from a gNB along with a RACH configuration. For example, for a CFRA procedure for handover, a target gNB may transmit, via a source gNB, one or more RRC messages comprising the first RNTI, e.g., C-RNTI, for a UE along with a RACH configuration, e.g., newUE-Identity in MobilityControlInfo information element of RRCConnectionReconfiguration in LTE.

Figure 27:
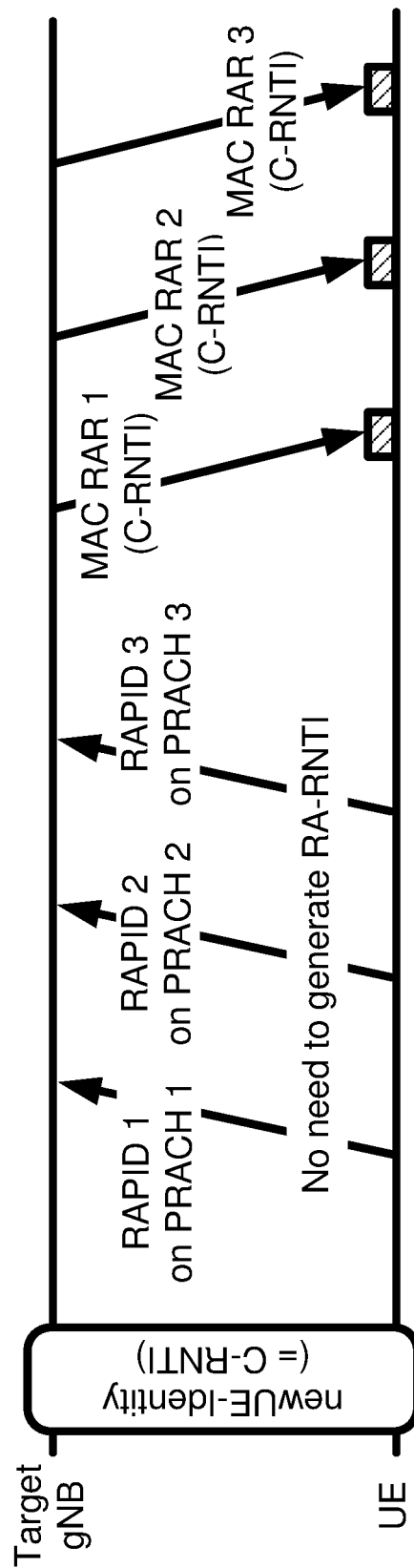
FIG. 27 is an example of a RA procedure configured with multiple RAP transmissions.

For the case of RA-RNTI employed for MAC RAR scrambling, a UE may perform blind decoding, e.g., search a MAC RAR from a PDCCH with multiple RA-RNTIs corresponding to the UE's multiple RAP transmissions. For example, a UE may perform a MAC RAR detection three times with RA-RNTI1, RA-RNTI2, and RA-RNTI3 in FIG. 26A. For the case of a first RNTI, e.g., C-RNTI, employed for a plurality of MAC RAR scrambling, a UE may perform a MAC RAR detection with the first RNTI, e.g., C-RNTI as illustrated in FIG. 27. The RAR detection with a single RNTI may reduce battery power consumption and processing requirements in UE.

Figure 28:
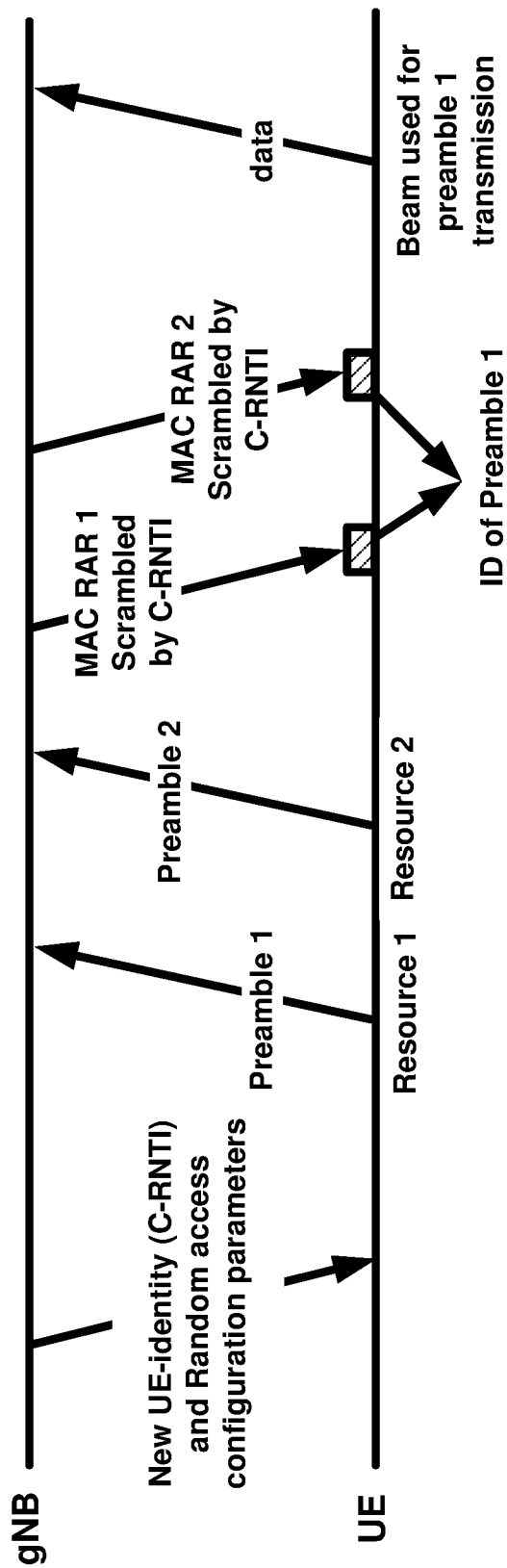
FIG. 28 is an example of a RA procedure configured with multiple RAP transmissions.

For example, a gNB may employ a C-RNTI or a sequence generated based on a C-RNTI, e.g., a truncated C-RNTI, for MAC RAR scrambling. FIG. 28 is an example of RAR detection with the C-RNTI. A gNB may transmit, to a UE, a message comprising a C-RNTI. When the UE performs a RA procedure, the C-RNTI may be employed for an RAR detection. For example, the UE may transmit a plurality of RAPs via different radio resources. In FIG. 28, the UE transmits Preamble 1 and preamble 2 via resource 1 and resource 2, respectively. The gNB may detect preamble 1 and preamble 2 and select preamble 1 as a preferred one. The gNB may transmit a plurality of RARs scrambled by the C-RNTIs. The plurality of RARs may comprise an indicator indicating the transmission of preamble 1. In a subsequent transmission, the UE may use a Tx beam used for the transmission of preamble 1, and the gNB may use an Rx beam used for the reception of preamble 1 transmission.

In an example, a wireless device may receive from a first base station, one or more messages comprising one or more configuration parameters of a second base station for indicating a cell radio network temporary identifier (C-RNTI), a plurality of random access preambles, and a plurality of random access channels associated with the plurality random access preambles. The wireless device may initiate a random access procedure by transmitting one or more random access preambles of the plurality random access preambles to the second base station employing one or more transmitting beams via one or more random access channels associated with the one or more random access preambles. The wireless device may receive from the second base station, one or more random access responses (RARs), wherein each of the one or more RARs comprises at least one subheader comprising a preamble identifier employed for indicating a transmission of a preamble selected by the second base station. The wireless device may complete the random access procedure in response to receiving at least one RAR associated with the C-RNTI, wherein a subheader in the at least one RAR comprises a first preamble identifier corresponding to one of the one or more random access preambles. The wireless device may determine a first transmitting beam for a subsequent uplink transmission to the second base station, wherein the first transmitting beam is employed to transmit a first preamble associated with the first preamble identifier.

In an example, a wireless device may receive from a first cell via a downlink control channel, at least one downlink control information comprising one or more configuration parameters of a second cell for indicating a plurality of random access preambles and/or a plurality of random access channels associated with the plurality random access preambles. The wireless device may initiate a random access procedure by transmitting one or more random access preambles of the plurality random access preambles to the second cell employing one or more transmitting beams via one or more random access channels associated with the one or more random access preambles. The wireless device may receive from the first cell, one or more random access responses (RARs), wherein each of the one or more RARs comprises at least one subheader comprising a preamble identifier employed for indicating a transmission of a preamble selected by the second cell. The wireless device may complete the random access procedure in response to receiving at least one RAR, wherein a subheader in the at least one RAR comprises a first preamble identifier corresponding to one of the one or more random access preambles. The wireless device may determine a first transmitting beam for a subsequent uplink transmission to the second cell, wherein the first transmitting beam is employed to transmit a first preamble associated with the first preamble identifier. The first cell may configure the wireless device with a radio network temporary identifier (RNTI). The at least one RAR may be scrambled by the RNTI associated with the wireless device.

In an example, for the case that multiple RAP transmissions are configured for the CFRA, a gNB may not know a number of RAP transmissions performed by a UE before the end of a RAR window. If a gNB may not know a number of RAP transmissions, the gNB may transmit one or more RARs to the UE at any occasion in time. In an example, a gNB may transmit one or more RARs in response to detecting a RAP firstly transmitted by a UE without waiting for one or more other RAPs that the UE may transmit. In this case, a gNB may not indicate a preferred RAP transmission since the one or more RARs transmitted by the gNB are corresponding to the RAP that the gNB detects firstly. In an example, a gNB may monitor a plurality of UL transmissions over configured one or more PRACH radio resources to detect one or more RAPs transmitted by a UE. In this case, a gNB may select at least one of the one or more detected RAPs and may indicate a preferred RAP transmission in one or more RARs. The transmitting time of the one or more RARs may vary. For example, the transmitting time of the one or more RARs may be in the middle of a RAR window and/or at the end of a RAR window.

In an example, a gNB may configure one or more parameters limiting a number of RAP transmissions for a UE. Monitoring a plurality of UL transmissions over configured one or more PRACH radio resources may result in increasing latency unnecessarily. For example, if a gNB configures a plurality of DL reference signals, e.g, SS blocks, configured with an association with a plurality of RACH radio resources, a UE may receive a subset of the plurality of DL reference signals. In this case, a number of RAP transmissions limited by the gNB may prevent the gNB from monitoring one or more RACH radio resources where the UE may skip to transmit one or more RAPs. For example, limiting a number of RAP transmission may reduce a power consumption at the UE.

The number of RAP transmissions limited by the gNB may be configurable and may depend on a number of beams configured with SS blocks and/or CSI-RS s at the gNB and/or a UE. For CFRA for handover, a target gNB may transmit, to a UE via a serving gNB, one or more RRC messages, e.g., a RRCConnectionReconfiguration message in LTE, comprising the one or more parameters for indicating a number of RAP transmissions limited by the target gNB. For CFRA for adding a SCell, one or more RRC messages, e.g., a RRCConnectionReconfiguration message in LTE, transmitted by a primary cell (PCell) for configuring to add SCell may comprise the one or more parameters for indicating a number of RAP transmissions limited by the gNB. For CFRA for adding a SCell, a PDCCH order initiating the CFRA for adding a SCell may comprise at least one DCI comprising a field for indicating a number of RAP transmissions limited by the gNB.

A number of RAP transmissions limited by the gNB may limit a number of consecutive RAP transmissions before the end of a RAR window. A number of RAP transmissions limited by the gNB may limit a total number of RAP transmissions before the end of a RAR window. Whether a number of RAP transmissions limited by the gNB indicates a number of consecutive RAP transmissions or not may be a UE implementation. NR may predefine whether a number of RAP transmissions limited by the gNB indicates a number of consecutive RAP transmissions or not.

In an example, if a number of RAP transmissions limited by the gNB, a gNB may monitor N transmission occasions, wherein N may be a number of RAP transmissions limited by the gNB. For example, if a gNB detects a RAP from a UE at an i-th transmission occasion, the gNB may monitor one or more PRACH radio resources at least until an (N+i−1)-th transmission occasion.

For example, if an allowed number of RAP transmissions is configured by a gNB, a gNB may need a waiting time to receive one or more preambles from a UE to select one of the one or more preambles transmissions as a preferred RAP transmission. During this waiting time, a UE may start to monitor a PDCCH for an RAR. This may increase UE power consumption. There may be a need to enhance random access procedure to reduce battery power consumption. Example embodiments determines when to start to monitor the PDCCH based on an allowed number of RAP transmissions configured by the gNB. Example embodiments implements a timing to start to monitor a PDCCH and may reduce battery power consumption at the UE.

In an example, if an allowed number of RAP transmissions is configured by a gNB, a UE may not start a RAR window in response to transmitting a RAP on a PRACH transmission occasion firstly occurred. The UE may delay, in response to transmitting a RAP on a PRACH transmission occasion firstly occurred, a starting time of a RAR window at least for a time duration corresponding to a number of RAP transmission is limited by a gNB. For example, a gNB may limit a number of RAP transmissions by N for a UE. If the UE transmit a RAP to the base station at an i-th transmission occasion, the UE may delay a starting time of a RAR window at least for a time duration corresponding to N transmission occasions.

NR may define a time offset employed for delaying a RAR window. For example, the time offset may depend on a required processing time for a gNB to prepare one or more RAR transmissions. A unit of time offset may be one of subframe, slot, or mini-slot. The unit of the time offset may depend on a numerology employed for a CFRA configured with a UE. NR may fix the time offset, which may be zero.

Figure 29:
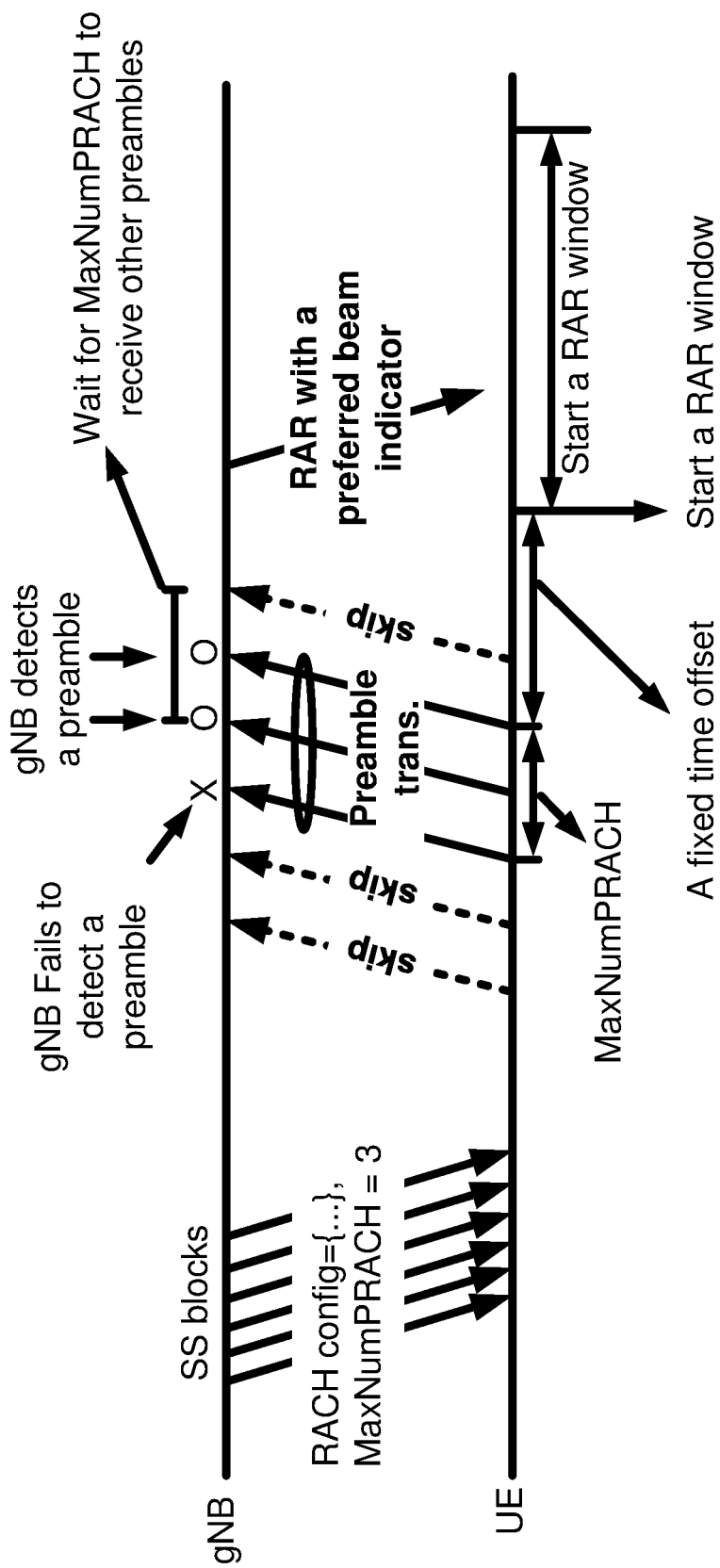
FIG. 29 is an example of a starting time of a RAR window an aspect of an embodiment of the present disclosure; a gNB configures a UE to transmit RAPs upto 3 times (MaxNumPRACH=3).

FIG. 29 illustrates an example of a starting time of a RAR window. A number of RAP transmissions may be limited by 3 (MaxNumPRACH=3) in the example. The example may assume that a unit of one transmission occasion may be a subframe. The unit may be slot, or mini-slot in NR. In the example, since a gNB fails to detect a RAP firstly transmitted by a UE, the gNB may wait for 3 transmission occasions (3 subframes in the example) from the subframe where the gNB detects a RAP firstly detected. In the example, a UE may start a RAR window with a delay corresponding to the amount of a fixed time offset and 3 transmission occasions.

In an example, a wireless device may receive from a base station, one or more messages comprising one or more parameters for indicating one or more random access preambles, a plurality of transmission occasions associated with the one or more random access preambles, and a first parameter employed for limiting a number of preamble transmission occasions of the plurality of transmission occasions. The wireless device may transmit to the base station, a first preamble of the one or more random access preambles via a first transmission occasion associated with the first preamble, wherein the first transmission occasion is a firstly occurred transmission occasion of one or more preamble transmission occasions limited by the first parameter. The wireless device may determine a starting time of a random access response window based on at least one of a time associated with the firstly occurred transmission occasion, a first offset depending on the first parameter, or a second offset. In an example, the second offset may be zero.

In an example, a wireless device may receive via one or more downlink control channels for a primary cell, one or more downlink control information comprising none or more configuration parameters for a secondary cell employed for indicating one or more random access preambles, a plurality of transmission occasions associated with the one or more random access preambles, and a first parameter employed for limiting a number of preamble transmission occasions of the plurality of transmission occasions. The wireless device may transmit to the base station, a first preamble of the one or more random access preambles via a first transmission occasion associated with the first preamble, wherein the first transmission occasion is a firstly occurred transmission occasion of one or more preamble transmission occasions limited by the first parameter. The wireless device may determine a starting time of a random access response window based on at least one of a time associated with the firstly occurred transmission occasion, a first offset depending on the first parameter, or a second offset. In an example, the second offset may be zero.

In an example, a wireless device may receive from a primary cell, one or more radio resource control messages comprising one or more configuration parameters for a secondary cell employed for indicating a first parameter employed for limiting a number of preamble transmission occasions of the plurality of transmission occasions configured in the secondary cell. The wireless device may receive via one or more downlink control channels for a primary cell, at least one downlink control information comprising one or more random access configuration parameters for the secondary cell employed for indicating one or more random access preambles and the plurality of transmission occasions associated with the one or more random access preambles. The wireless device may transmit to the base station, a first preamble of the one or more random access preambles via a first transmission occasion associated with the first preamble, wherein the first transmission occasion is a firstly occurred transmission occasion of one or more preamble transmission occasions limited by the first parameter. The wireless device may determine a starting time of a random access response window based on at least one of a time associated with the firstly occurred transmission occasion, a first offset depending on the first parameter, or a second offset. In an example, the second offset may be zero.

According to various embodiments, a device such as, for example, a wireless device, a base station, base station central unit, a base station distributed unit, a core network entity, and/or the like, may comprise one or more processors and memory. The memory may store instructions that, when executed by the one or more processors, cause the device to perform a series of actions. Embodiments of example actions may be illustrated in the accompanying figures and specification. Features from various embodiments may be combined to create yet further embodiments.

FIG. 30 is an example flow diagram as per an aspect of an embodiment of the present disclosure. At 3010, by a wireless device may receive from a first base station, at least one message comprising one or more configuration parameters of a second base station comprising a cell. The one or more configuration parameters may indicate a cell radio identifier. The one or more configuration parameters may indicate a cell radio identifier. The one or more configuration parameters may indicate a plurality of random access preambles of the cell. The one or more configuration parameters may indicate one or more random access channel occasions of the cell. At 3020, the wireless device may transmit to the second base station via the one or more random access channel occasions of the cell, one or more random access preambles of the plurality of random access preambles using a plurality of transmit beams. At 3030, at least one random access response identified by the cell radio identifier may be received. The at least one random access response may comprise a first preamble identifier corresponding to a first random access preamble of the one or more random access preambles. At 3040, a first transmit beam of the plurality of transmit beams used to transmit the first random access preamble may be determined. At 3050, the wireless device may transmit data using the first transmit beam to the second base station.

According to an embodiment, a timer may be started in response to the transmitting the one or more random access preambles. According to an embodiment, a downlink control channel of the second base station may be monitored for the random access response. According to an embodiment, a downlink control channel of the second base station may be monitored for the random access response. According to an embodiment, the at least one random access response may comprise a medium access control subheader comprising the first preamble identifier. According to an embodiment, the at least one random access response may comprise a medium access control random access response corresponding to the medium access control subheader. According to an embodiment, the medium access control random access response may comprise a timing advance command and an uplink grant. According to an embodiment, the one or more configuration parameters may indicate a number of allowed transmissions of the one or more random access preambles. According to an embodiment, a number of the one or more random access preambles may be equal to or less than the number of allowed transmissions of the one or more random access preambles. According to an embodiment, the cell radio identifier may be a cell radio network temporary identifier.

According to an embodiment, the one or more configuration parameters of one or more downlink reference signals of the second base station may be received from the first base station. According to an embodiment, the one or more downlink reference signals may be received from the second base station. According to an embodiment, the one or more downlink reference signals may be one or more channel state information reference signals. According to an embodiment, the one or more downlink reference signals may be one or more synchronization signals. According to an embodiment, each of the one or more synchronization signals may comprise a primary synchronization signal and a secondary synchronization signal. According to an embodiment, the secondary synchronization signal may indicate a cell identifier of the cell. According to an embodiment, the primary synchronization signal and the secondary synchronization signal may be time division multiplexed with a physical broadcast channel. According to an embodiment, the primary synchronization signal may be a Zadoff-Chu sequence. According to an embodiment, the one or more downlink reference signals may be one or more periodic channel state information reference signals. According to an embodiment, the one or more channel state information reference signals may be one or more periodic channel state information reference signals. According to an embodiment, the each of the one or more synchronization signals may comprise a tertiary synchronization signal. According to an embodiment, the one or more configuration parameters may indicate a handover to the second base station.

FIG. 31 is an example flow diagram as per an aspect of an embodiment of the present disclosure. At 3110, a second base station may transmit via a first base station to a wireless device, at least one message comprising one or more configuration parameters of the second base station comprising a cell. The one or more configuration parameters may indicate a cell radio identifier. The one or more configuration parameters may indicate a plurality of random access preambles of the cell. The one or more configuration parameters may indicate one or more random access channel occasions of the cell. At 3120, the second base station may receive via the one or more random access channel occasions of the cell, one or more random access preambles of the plurality of random access preambles. At 3130, a first random access preamble of the one or more random access preambles may be determined. A pathloss measurement value of the first random access preamble may be equal to or larger than pathloss measurement values of the one or more random access preambles. At 3140, the second base station may transmit at least one random access response identified by the cell radio identifier. The at least one random access response may comprise the first preamble identifier corresponding to a first random access preamble.

The method of claim 1, further comprising starting a timer in response to the receiving the one or more random access preambles. According to an embodiment, the at least one random access response may comprise a medium access control subheader comprising the first preamble identifier. According to an embodiment, the at least one random access response may comprise a medium access control random access response corresponding to the medium access control subheader. According to an embodiment, the at least one random access response may comprise a medium access control subheader comprising the first preamble identifier. According to an embodiment, the at least one random access response may comprise a medium access control random access response corresponding to the medium access control subheader. According to an embodiment, the medium access control random access response may comprise a timing advance command and an uplink grant. According to an embodiment, the one or more configuration parameters may indicate a number of allowed transmissions of the one or more random access preambles. According to an embodiment, a number of the one or more random access preambles may be equal to or less than the number of allowed transmissions of the one or more random access preambles. According to an embodiment, the cell radio identifier may be a cell radio network temporary identifier.

According to an embodiment, second base station may transmit the one or more configuration parameters of one or more downlink reference signals of the second base station to the wireless device via the first base station. According to an embodiment, the second base station may transmit the one or more downlink reference signals. According to an embodiment, the one or more downlink reference signals may be one or more channel state information reference signals. According to an embodiment, the one or more downlink reference signals may be one or more synchronization signals. According to an embodiment, each of the one or more synchronization signals may comprise a primary synchronization signal and a secondary synchronization signal. According to an embodiment, the secondary synchronization signal may indicate a cell identifier of the cell. According to an embodiment, the primary synchronization signal and the secondary synchronization signal may be time division multiplexed with a physical broadcast channel. According to an embodiment, the primary synchronization signal may be a Zadoff-Chu sequence. According to an embodiment, the one or more downlink reference signals may be one or more periodic channel state information reference signals. According to an embodiment, the one or more channel state information reference signals may be one or more periodic channel state information reference signals. According to an embodiment, the each of the one or more synchronization signals may comprise a tertiary synchronization signal. According to an embodiment, the one or more configuration parameters may indicate a handover to the second base station.

Figure 32:
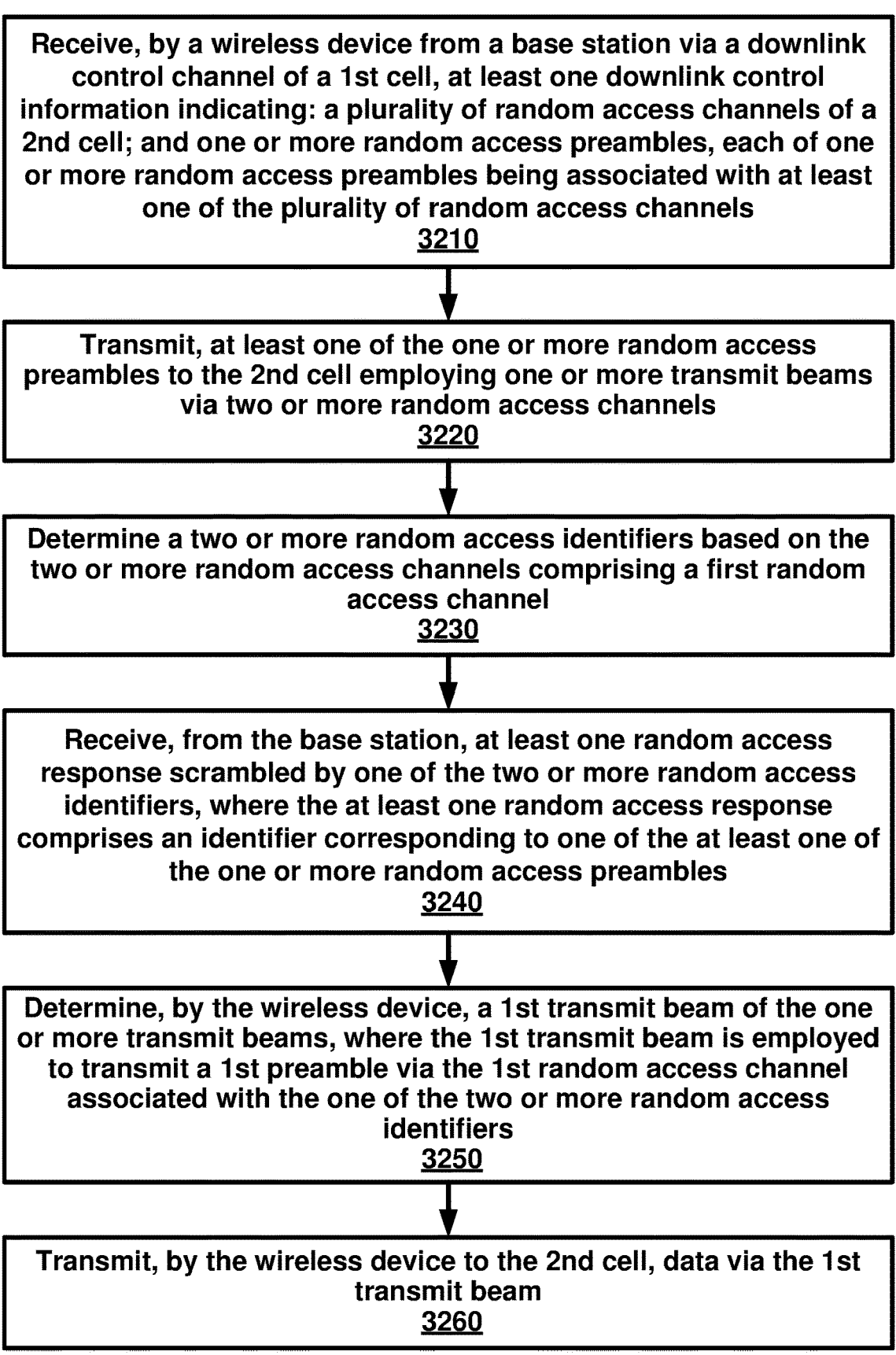
FIG. 32 is an example flow diagram as per an aspect of an embodiment of the present disclosure.

FIG. 32 is an example flow diagram as per an aspect of an embodiment of the present disclosure. At 3210, a wireless device may receive at least one downlink control information from a base station via a downlink control channel of a first cell. The at least one downlink control information may indicate a plurality of random access channels of a second cell. The at least one downlink control information may indicate one or more random access preambles. Each of one or more random access preambles may be associated with at least one of the plurality of random access channels. At 3220, at least one of the one or more random access preambles may be transmitted to the second cell employing one or more transmit beams via two or more random access channels. At 3230, two or more random access identifiers may be determined based on the two or more random access channels comprising a first random access channel. At 3240, at least one random access response scrambled by one of the two or more random access identifiers may be received from the base station. The at least one random access response may comprise an identifier corresponding to one of the at least one of the one or more random access preambles. At 3250, the wireless device may determine a first transmit beam of the one or more transmit beams. The first transmit beam may be employed to transmit a first preamble via the first random access channel associated with the one of the two or more random access identifiers. At 3260, the wireless device may transmit data to the second cell via the first transmit beam.

According to an embodiment, the first cell may be a primary cell. According to an embodiment, the second cell may be a secondary cell. According to an embodiment, a pathloss measurement measured via the first random access channel may be the highest among pathloss measurements measured the two or more random access channels. According to an embodiment, the one of the at least one of the one or more random access preambles may be transmitted via the first random access channel. According to an embodiment, a pathloss measurement measured via the first random access channel may be the highest among pathloss measurements measured the two or more random access channels. According to an embodiment, the one of the at least one of the one or more random access preambles may be transmitted via a second random access channel. According to an embodiment, a pathloss measurement of the one of the at least one of the one or more random access preambles may be the highest among pathloss measurements of the at least one of the one or more random access preamble. According to an embodiment, a timer may be started in response to the transmitting the at least one of the one or more random access preambles.

According to an embodiment, the at least one random access response may comprise a medium access control subheader comprising the preamble identifier. According to an embodiment, the at least one random access response may comprise a medium access control random access response corresponding to the medium access control subheader. According to an embodiment, the one or more configuration parameters indicate a number of allowed transmissions of the one or more random access preambles. According to an embodiment, a number of the one or more random access preambles may be equal to or less than the number of allowed transmissions of the one or more random access preambles. According to an embodiment, the first random access identifier may comprise time and frequency resource indices of the first random access channel.

According to an embodiment, the one or more configuration parameters of one or more downlink reference signals of the second cell may be received from the base station. According to an embodiment, the one or more downlink reference signals may be received from the base station. According to an embodiment, the one or more downlink reference signals may be one or more channel state information reference signals. According to an embodiment, the one or more downlink reference signals may be one or more synchronization signals. According to an embodiment, each of the one or more synchronization signals may comprise a primary synchronization signal and a secondary synchronization signal. According to an embodiment, the secondary synchronization signal may indicate a cell identifier of the cell. According to an embodiment, the primary synchronization signal and the secondary synchronization signal may be time division multiplexed with a physical broadcast channel. According to an embodiment, the primary synchronization signal may be a Zadoff-Chu sequence.

FIG. 33 is an example flow diagram as per an aspect of an embodiment of the present disclosure. At 3310, a base station may transmit at least one downlink control information to a wireless device via a downlink control channel of a first cell. The at least one downlink control information may indicate a plurality of random access channels of a second cell. The at least one downlink control information may indicate one or more random access preambles. Each of the one or more random access preambles may be associated with at least one of the plurality of random access channels. At 3320, the base station may receive at least one of the one or more random access preambles from the wireless device via two or more random access channels of the second cell. At 3330, a first random access identifier corresponding to a first random access channel of the two or more random access channels may be determined. The first random access identifier may be selected based on pathloss measurements measured via the two or more random access channels. At 3340, the base station may transmit to the wireless device, at least one random access response scrambled by the first random access identifier of the first random access channel. The at least one random access response may comprise a preamble identifier corresponding to one of the at least one of the one or more random access preambles.

According to an embodiment, the first cell may be a primary cell. According to an embodiment, the second cell may be a secondary cell. According to an embodiment, a pathloss measurement measured via the first random access channel may be the highest among pathloss measurements measured the two or more random access channels. According to an embodiment, the one of the at least one of the one or more random access preambles may be received via the first random access channel. According to an embodiment, a pathloss measurement measured via the first random access channel may be the highest among pathloss measurements measured the two or more random access channels. According to an embodiment, the one of the at least one of the one or more random access preambles may be received via a second random access channel. According to an embodiment, a pathloss measurement of the one of the at least one of the one or more random access preambles may be the highest among pathloss measurements of the at least one of the one or more random access preamble. According to an embodiment, a timer may be started in response to the receiving the at least one of the one or more random access preambles. According to an embodiment, the at least one random access response may comprise a medium access control subheader comprising the preamble identifier.

According to an embodiment, the at least one random access response may comprise a medium access control random access response corresponding to the medium access control subheader. According to an embodiment, the one or more configuration parameters may indicate a number of allowed transmissions of the one or more random access preambles. According to an embodiment, a number of the one or more random access preambles may be equal to or less than the number of allowed transmissions of the one or more random access preambles. According to an embodiment, the first random access identifier may comprise time and frequency resource indices of the first random access channel.

According to an embodiment, the one or more configuration parameters of one or more downlink reference signals of the second cell may be transmitted by the base station. According to an embodiment, the one or more downlink reference signals may be transmitted by the base station. According to an embodiment, the one or more downlink reference signals may be one or more channel state information reference signals. According to an embodiment, the one or more downlink reference signals may be one or more synchronization signals. According to an embodiment, each of the one or more synchronization signals may comprise a primary synchronization signal and a secondary synchronization signal. According to an embodiment, the secondary synchronization signal may indicate a cell identifier of the cell. According to an embodiment, the primary synchronization signal and the secondary synchronization signal may be time division multiplexed with a physical broadcast channel. According to an embodiment, the primary synchronization signal may be a Zadoff-Chu sequence.

FIG. 34 is an example flow diagram as per an aspect of an embodiment of the present disclosure. At 3410, a wireless device may receive one or more messages from a first base station. The one or more messages may comprise one or more parameters. The one or more parameters may indicate: one or more random access preambles, a plurality of transmission occasions, and a first number of allowed preamble transmissions. At 3420, at least one of the one or more random access preamble may be transmitted to a second base station via one or more transmission occasions of the plurality of transmission occasions. The one or more transmission occasions may comprise a first transmission occasion. At 3430, a starting time of a random access response window may be determined based on: a time associated with the first transmission occasion, a first offset depending on the first number, and a second offset. At 3440, the wireless device may start to monitor a control channel for at least one random access response from the starting time.

According to an embodiment, the second offset may be zero. According to an embodiment, the first transmission occasion may be the first to occur transmission occasion of the one or more transmission occasions. According to an embodiment, the one or more parameters may indicate an association between the one or more random access preambles and the plurality of transmission occasions. According to an embodiment, the at least one random access response may comprise at least one subheader comprising an identifier of one of the at least one of the one or more random access preambles. According to an embodiment, a number of the least one of the one or more random access preambles may be equal to or less than the first number. According to an embodiment, the at least one random access response may be received from the second base station. According to an embodiment, the at least one random access response may comprise: a medium access control subheader comprising a preamble identifier, and a medium access control random access response corresponding to the medium access control subheader. According to an embodiment, the preamble identifier may be corresponding to one of the at least one of the one or more random access preambles. According to an embodiment, the medium access control random access response may comprise a timing advance command and an uplink grant. According to an embodiment, the at least one random access response may be scrambled by a random access radio network temporary identifier. According to an embodiment, the random access radio network temporary identifier may comprise time and frequency indices of one of the one or more transmission occasions.

According to an embodiment, the one or more configuration parameters of one or more downlink reference signals of the second base station may be received from the first base station. According to an embodiment, the one or more downlink reference signals may be received from the second base station. According to an embodiment, the one or more downlink reference signals may be one or more channel state information reference signals. According to an embodiment, the one or more downlink reference signals may be one or more synchronization signals. According to an embodiment, each of the one or more synchronization signals may comprise a primary synchronization signal and a secondary synchronization signal. According to an embodiment, the secondary synchronization signal may indicate a cell identifier of the cell. According to an embodiment, the primary synchronization signal and the secondary synchronization signal may be time division multiplexed with a physical broadcast channel. According to an embodiment, the primary synchronization signal may be a Zadoff-Chu sequence. According to an embodiment, the one or more downlink reference signals may be one or more periodic channel state information reference signals.

FIG. 35 is an example flow diagram as per an aspect of an embodiment of the present disclosure. At 3510, a second base station may transmit one or more messages to a wireless device via a first base station. The one or more messages may comprise one or more parameters indicating: one or more random access preambles, a plurality of transmission occasions, and a first number of allowed preamble transmissions. At 3520, the second base station may receive at least one of the one or more random access preambles via one or more transmission occasions of the plurality of transmission occasions. The one or more transmission occasions may comprise a first transmission occasion. At 3530, the second base station may determine a starting time of a random access response window based on: a time associated with the first transmission occasion, a first offset depending on the first number, and a second offset. At 3540, the second base station may transmit via a control channel, at least one random access response during the random access response window.

According to an embodiment, the second offset may be zero. According to an embodiment, the first transmission occasion may be the first to detect one of one or more random access preambles among the one or more transmission occasions. According to an embodiment, the one or more parameters may indicate an association between the one or more random access preambles and the plurality of transmission occasions. According to an embodiment, the at least one random access response may comprise at least one subheader comprising an identifier of one of the at least one of the one or more random access preambles. According to an embodiment, a number of the least one of the one or more random access preambles may be equal to or less than the first number. According to an embodiment, the at least one random access response may comprise: a medium access control subheader comprising a preamble identifier, and a medium access control random access response corresponding to the medium access control subheader. According to an embodiment, the preamble identifier may be corresponding to one of the at least one of the one or more random access preambles. According to an embodiment, the medium access control random access response may comprise a timing advance command and an uplink grant. According to an embodiment, the at least one random access response may be scrambled by a random access radio network temporary identifier. According to an embodiment, the random access radio network temporary identifier may comprise time and frequency indices of one of the one or more transmission occasions.

According to an embodiment, the first base station may transmit the one or more configuration parameters of one or more downlink reference signals of the second base station. According to an embodiment, the second base station may transmit the one or more downlink reference signals. According to an embodiment, the one or more downlink reference signals may be one or more channel state information reference signals. According to an embodiment, the one or more downlink reference signals may be one or more synchronization signals. According to an embodiment, each of the one or more synchronization signals may comprise a primary synchronization signal and a secondary synchronization signal. According to an embodiment, the secondary synchronization signal may indicate a cell identifier of the cell. According to an embodiment, the primary synchronization signal and the secondary synchronization signal may be time division multiplexed with a physical broadcast channel. According to an embodiment, the primary synchronization signal may be a Zadoff-Chu sequence. According to an embodiment, the one or more downlink reference signals may be one or more periodic channel state information reference signals. According to an embodiment, the one or more configuration parameters may indicate a handover to the second base station.

FIG. 36 is an example flow diagram as per an aspect of an embodiment of the present disclosure. At 3610, a wireless device may receive one or more messages from a base station. The one or more messages may comprise one or more configuration parameters of a second cell indicating: a first number of preamble transmission occasions, and a plurality of transmission occasions. At 3620, at least one downlink control information may be received via one or more downlink control channels of a first cell. The at least one downlink control information may comprise one or more random access configuration parameters of the second cell. The one or more random access configuration parameters may indicate one or more random access preambles. At 3630, at least one of the one or more random access preambles may be transmitted via one or more transmission occasions of the plurality of transmission occasions. The one or more transmission occasions may comprise a first transmission occasion. At 3640, a starting time of a random access response (RAR) window may be determined based on: a time associated with the first transmission occasion, a first offset depending on the first number, and a second offset. At 3650, monitoring of a control channel for an RAR may be started from the starting time.

According to an embodiment, the second offset may be zero. According to an embodiment, the first cell may be a primary cell. According to an embodiment, the second cell may be a secondary cell. According to an embodiment, the first transmission occasion may be the first to occur transmission occasion of the at least one of the one or more random access preambles. According to an embodiment, the one or more configuration parameters may indicate an association between the one or more random access preambles and the plurality of transmission occasions. According to an embodiment, the at least one RAR may comprise at least one subheader comprising an identifier of one of the least one of the one or more random access preambles. According to an embodiment, a number of the least one of the one or more random access preambles may be equal to or less than the first number. According to an embodiment, the at least one random access response may be received. According to an embodiment, the at least one radon access response may comprise a medium access control subheader comprising a preamble identifier, and a medium access control random access response corresponding to the medium access control subheader. According to an embodiment, the preamble identifier may correspond to one of the at least one of the one or more random access preambles. According to an embodiment, the medium access control random access response may comprise a timing advance command and an uplink grant. According to an embodiment, the at least one random access response may be scrambled by a random access radio network temporary identifier. According to an embodiment, the random access radio network temporary identifier may comprise time and frequency indices of one of the one or more transmission occasions.

According to an embodiment, the one or more configuration parameters of one or more downlink reference signals of the second base station may be received from from the base station. According to an embodiment, the one or more downlink reference signals may be received from the base station. According to an embodiment, the one or more downlink reference signals may be one or more channel state information reference signals. According to an embodiment, the one or more downlink reference signals may be one or more synchronization signals. According to an embodiment, the one or more synchronization signals may comprise a primary synchronization signal and a secondary synchronization signal. According to an embodiment, the secondary synchronization signal may indicate a cell identifier of the cell. According to an embodiment, the primary synchronization signal and the secondary synchronization signal may be time division multiplexed with a physical broadcast channel.

FIG. 37 is an example flow diagram as per an aspect of an embodiment of the present disclosure. At 3710, a base station comprising a first cell and a second cell may transmit one or more messages to a wireless device. The one or more messages may comprise one or more configuration parameters of the second cell indicating: a first number of preamble transmission occasions, and a plurality of transmission occasions. At 3720, at least one downlink control information may be transmitted via one or more downlink control channels of the first cell. The at least one downlink control information may comprise one or more random access configuration parameters of the second cell. The one or more random access configuration parameters may indicate one or more random access preambles. At 3730, at least one of the one or more random access preambles may be received via one or more transmission occasions of the plurality of transmission occasions. The one or more transmission occasions may comprise a first transmission occasion. At 3740, a starting time of a random access response window may be determined based on: a time associated with the first transmission occasion, a first offset depending on the first number, and a second offset. At 3750, the base station may transmit via a control channel, at least one radon access response during the random access response window.

According to an embodiment, the second offset may be zero. According to an embodiment, the first cell may be a primary cell. According to an embodiment, the second cell may be a secondary cell. According to an embodiment, the first transmission occasion may be the first to detect one of one or more random access preambles among the one or more transmission occasions. According to an embodiment, the one or more configuration parameters may indicate an association between the one or more random access preambles and the plurality of transmission occasions. According to an embodiment, the at least one radon access response may comprise at least one subheader comprising an identifier of one of the least one of the one or more random access preambles. According to an embodiment, a number of the least one of the one or more random access preambles may be equal to or less than the first number. According to an embodiment, the at least one radon access response may comprise: a medium access control subheader comprising a preamble identifier, and a medium access control random access response corresponding to the medium access control subheader. According to an embodiment, the preamble identifier may be corresponding to one of the at least one of the one or more random access preambles. According to an embodiment, the medium access control random access response may comprise a timing advance command and an uplink grant. According to an embodiment, the wireless device may receive data via resources indicated by the uplink grant. According to an embodiment, the at least one random access response may be scrambled by a random access radio network temporary identifier. According to an embodiment, the random access radio network temporary identifier may comprise time and frequency indices of one of the one or more transmission occasions.

According to an embodiment, the one or more configuration parameters of one or more downlink reference signals of the second cell may be received from the base station. According to an embodiment, the one or more downlink reference signals may be received from the base station. According to an embodiment, the one or more downlink reference signals may be one or more channel state information reference signals. According to an embodiment, the one or more downlink reference signals may be one or more synchronization signals. According to an embodiment, each of the one or more synchronization signals may comprise a primary synchronization signal and a secondary synchronization signal. According to an embodiment, the secondary synchronization signal may indicate a cell identifier of the cell. According to an embodiment, the primary synchronization signal and the secondary synchronization signal may be time division multiplexed with a physical broadcast channel.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. After reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the disclosure may also be implemented in a system comprising one or more TDD cells (e.g. frame structure 2 and/or frame structure 3-licensed assisted access). The disclosed methods and systems may be implemented in wireless or wireline systems. The features of various embodiments presented in this disclosure may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device from a first base station, configuration parameters indicating:
     a cell radio identifier of the wireless device; and
     random access preambles of a cell of a second base station;
   transmitting, to the second base station via the cell, one or more random access preambles of the random access preambles using transmit beams;
   receiving at least one random access response identified by the cell radio identifier of the wireless device, wherein:
     the at least one random access response comprises a first preamble identifier corresponding to a first random access preamble of the one or more random access preambles; and
     the first random access preamble is transmitted by a first transmit beam of the transmit beams; and
   transmitting, by the wireless device to the second base station, data using the first transmit beam.

2. The method of claim 1, further comprising starting a timer in response to the transmitting the one or more random access preambles.

3. The method of claim 2, further comprising monitoring a downlink control channel of the second base station for the at least one random access response.

4. The method of claim 1, further comprising monitoring a downlink control channel of the second base station for the at least one random access response.

5. The method of claim 1, wherein the at least one random access response comprises:
   a medium access control subheader comprising the first preamble identifier; and
   a medium access control random access response corresponding to the medium access control subheader.

6. The method of claim 5, wherein the medium access control random access response comprises a timing advance command and an uplink grant.

7. The method of claim 1, wherein the configuration parameters indicate a number of allowed transmissions of the one or more random access preambles.

8. The method of claim 7, wherein a number of the one or more random access preambles is equal to or less than the number of allowed transmissions of the one or more random access preambles.

9. The method of claim 1, wherein the cell radio identifier is a cell radio network temporary identifier.

10. The method of claim 1, wherein the configuration parameters further indicate a handover to the second base station.

11. A wireless device comprising:
one or more processors; and
memory storing instructions that, when executed by the one or more processors, cause the wireless device to:
receive, from a first base station, configuration parameters indicating:
a cell radio identifier of the wireless device; and
random access preambles of a cell of a second base station;
transmit, to the second base station via the cell, one or more random access preambles of the random access preambles using transmit beams;
receive at least one random access response identified by the cell radio identifier of the wireless device, wherein:
the at least one random access response comprises a first preamble identifier corresponding to a first random access preamble of the one or more random access preambles; and
the first random access preamble is transmitted by a first transmit beam of the transmit beams; and
transmit, to the second base station, data using the first transmit beam.

12. The wireless device of claim 11, wherein the instructions, when executed by the one or more processors, further cause the wireless device to start a timer in response to the one or more random access preambles being transmitted.

13. The wireless device of claim 12, wherein the instructions, when executed by the one or more processors, further cause the wireless device to monitor a downlink control channel of the second base station for the at least one random access response.

14. The wireless device of claim 11, wherein the instructions, when executed by the one or more processors, further cause the wireless device to monitor a downlink control channel of the second base station for the at least one random access response.

15. The wireless device of claim 11, wherein the at least one random access response comprises:
a medium access control subheader comprising the first preamble identifier; and
a medium access control random access response corresponding to the medium access control subheader.

16. The wireless device of claim 15, wherein the medium access control random access response comprises a timing advance command and an uplink grant.

17. The wireless device of claim 11, wherein the configuration parameters indicate a number of allowed transmissions of the one or more random access preambles.

18. The wireless device of claim 17, wherein a number of the one or more random access preambles is equal to or less than the number of allowed transmissions of the one or more random access preambles.

19. The wireless device of claim 11, wherein the cell radio identifier is a cell radio network temporary identifier.

20. A system comprising:
a first base station; and
a wireless device comprising:
one or more processors; and
memory storing instructions that, when executed by the one or more processors, cause the wireless device to:
receive, from the first base station, configuration parameters configuration parameters indicating:
a cell radio identifier of the wireless device; and
random access preambles of a cell of a second base station;
transmit, to the second base station via the cell, one or more random access preambles of the random access preambles using transmit beams;
receive at least one random access response identified by the cell radio identifier of the wireless device, wherein:
the at least one random access response comprises a first preamble identifier corresponding to a first random access preamble of the one or more random access preambles; and
the first random access preamble is transmitted by a first transmit beam of the transmit beams; and
transmit, to the second base station, data using the first transmit beam.

* * * * *